(12) United States Patent
Wang et al.

(10) Patent No.: US 11,778,213 B2
(45) Date of Patent: *Oct. 3, 2023

(54) ACTIVATION FUNCTION DESIGN IN NEURAL NETWORK-BASED FILTERING PROCESS FOR VIDEO CODING

(71) Applicant: QUALCOMM Incorporated, San Diego, CA (US)

(72) Inventors: Hongtao Wang, San Diego, CA (US); Jianle Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/936,300

(22) Filed: Sep. 28, 2022

(65) Prior Publication Data

US 2023/0012661 A1 Jan. 19, 2023

Related U.S. Application Data

(63) Continuation of application No. 17/489,459, filed on Sep. 29, 2021.
(Continued)

(51) Int. Cl.
*H04N 19/176* (2014.01)
*H04N 19/436* (2014.01)
(Continued)

(52) U.S. Cl.
CPC ............ *H04N 19/436* (2014.11); *G06N 3/04* (2013.01); *H04N 19/117* (2014.11);
(Continued)

(58) Field of Classification Search
None
See application file for complete search history.

(56) References Cited

U.S. PATENT DOCUMENTS 10,909,728 B1 * 2/2021 Appalaraju ............... G06T 3/40
10,944,996 B2 3/2021 Bortman et al.
(Continued)

FOREIGN PATENT DOCUMENTS

EP 3451293 A1 3/2019
EP 3706046 A1 9/2020
(Continued)

OTHER PUBLICATIONS

Bross B., et al., "Versatile Video Coding (Draft 10)", Joint Video Experts Team (JVET) of ITU-T SG 16 WP 3 and ISO/IEC JTC 1/SC 29/WG 11, 131, MPEG Meeting, 19th Meeting, by Teleconference, Jun. 22-Jul. 1, 2020, Jun. 29, 2020-Jul. 3, 2020, Online, (Motion Picture Expert Group or ISO/IEC JTC1/SC29/WG11), No. JVET-S2001-vH, Sep. 4, 2020, XP030293002, 548 Pages.
(Continued)

*Primary Examiner* — Jessica M Prince
(74) *Attorney, Agent, or Firm* — Shumaker & Sieffert, PA

(57) ABSTRACT

A method of coding video data, the method comprising: reconstructing a block of the video data; and applying a Convolutional Neural Network (CNN)-based filter to the reconstructed block, wherein the CNN-based filter uses a LeakyReLU activation function.

20 Claims, 12 Drawing Sheets

Related U.S. Application Data

(60) Provisional application No. 63/085,936, filed on Sep. 30, 2020.

(51) Int. Cl.
  *G06N 3/04* (2023.01)
  *H04N 19/70* (2014.01)
  *H04N 19/184* (2014.01)
  *H04N 19/117* (2014.01)
  *H04N 19/82* (2014.01)

(52) U.S. Cl.
  CPC ......... *H04N 19/176* (2014.11); *H04N 19/184* (2014.11); *H04N 19/70* (2014.11); *H04N 19/82* (2014.11)

(56) References Cited

U.S. PATENT DOCUMENTS

| | | | |
|---|---|---|---|
| 2018/0204314 A1 | 7/2018 | Kaplanyan et al. | |
| 2019/0273948 A1* | 9/2019 | Yin | G06N 3/045 |
| 2020/0226451 A1 | 7/2020 | Liu et al. | |
| 2020/0280717 A1 | 9/2020 | Li et al. | |
| 2020/0311870 A1 | 10/2020 | Jung et al. | |
| 2020/0349681 A1 | 11/2020 | Andrei et al. | |
| 2022/0092795 A1* | 3/2022 | Liu | G06T 3/4007 |
| 2022/0103845 A1 | 3/2022 | Wang et al. | |

FOREIGN PATENT DOCUMENTS

| | | | |
|---|---|---|---|
| WO | 2020150264 A1 | 7/2020 | |
| WO | 2020188273 A1 | 9/2020 | |

OTHER PUBLICATIONS

Chen J., et al., "AHG11: In-Loop Filtering with Convolutional Neural Network and Large Activation", JVET-U0104-v2, Joint Video Experts Team (JVET) of ITU-T SG 16 WP 3 and ISO/IEC JTC 1/SC 29, 21th Meeting: by teleconference, Jan. 6-15, 2021, pp. 1-5.
He K., et al., "Delving Deep into Rectifiers: Surpassing Human-Level Performance on ImageNet Classification", IEEE International Conference on Computer Vision, arXiv: 1502.01852v1 [cs.CV], Feb. 6, 2015, pp. 1026-1034.
Hsiao Y-L., et al., "AHG9: Convolutional Neural Network Loop Filter", JVET-M0159-v1, 13th Meeting: Joint Video Experts Team (JVET) of ITU-T SG 16 WP 3 and ISO/IEC JTC 1/SC 29/WG 11, No. JVET-M0159, Jan. 9, 2019 (Jan. 9, 2019), XP030201009, Retrieved from the Internet: URL: http://phenix.int-evry.fr/jvet/doc_end_user/documents/13_Marrakech/wg11/JVET-M0159-v2.zip JVET-M0159-v1 docx [Retrieved on Jan. 9, 2019], Marrakech, MA, Jan. 9-18, 2019, pp. 1-6.
International Search Report and Written Opinion—PCT/US2021/052950—ISA/EPO—dated Feb. 11, 2022.
ITU-T H.265, "Series H: Audiovisual and Multimedia Systems, Infrastructure of Audiovisual Services—Coding of Moving Video, High efficiency Video Coding", The International Telecommunication Union, Dec. 2016, 664 Pages.
ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.
Jang Y., et al., "Video Prediction with Appearance and Motion Conditions", arxiv.org, Cornell University Library, 201 Olin Library Cornell University Ithaca, NY 14853, Jul. 7, 2018 (Jul. 7, 2018), XP081244993, 14 Pages.
Li Y., et al., "CE10: Summary Report on Neural Network Based Filter for Video Coding", JVET-O0030-v4, Joint Video Experts Team (JVET) of ITU-T SG 16 WP 3 and ISO/IEC JTC 1/SC 29/WG 11, 15th Meeting: Gothenburg, SE, Jul. 3-12, 2019, pp. 1-10.
Li Y., et al., "CE13: Summary Report on Neural Network Based Filter for Video Coding", JVET-N0033-v2, Joint Video Experts Team (JVET) of ITU-T SG 16 WP 3 and ISO/IEC JTC 1/SC 29/WG 11, 14th Meeting: Geneva, CH, Mar. 19-27, 2019, pp. 1-11.
Liu S., et al., "JVET Common Test Conditions and Evaluation Procedures for Neural Network-Based Video Coding Technology", JVET-T2006-v2, Joint Video Experts Team (JVET) of ITU-T SG 16 WP 3 and ISO/IEC JTC 1/SC 29/WG 11, 20th Meeting: by teleconference, Oct. 7-16, 2020, pp. 1-9.
Liu S., et al., "Methodology and Reporting Template for Neural Network Coding Tool Testing", JVET-T0041-v4, Joint Video Experts Team (JVET) of ITU-T SG 16 WP 3 and ISO/IEC JTC 1/SC 29, 20th Meeting: by teleconference, Oct. 7-16, 2020, 14 Pages.
Ma D., et al., "BVI-DVC: A Training Database for Deep Video Compression", IEEE, arXiv-2003.13552v2, Oct. 8, 2020, 11 pages.
Timofte R., et al., "DIV2K Dataset: Diverse 2K Resolution High Quality Images as Used for the Challenges @ NTIRE (CVPR 2017 (http://www.vision.ee.ethz.ch/ntire17) and CVPR 2018 ( http://www.vision.ee.ethz.ch/ntire18)) and @ PIRM (ECCV 2018 (https://www.pirm2018.org/))", 6 Pages, Retrieved from the Internet on Oct. 27, 2021, https://data.vision.ee.ethz.ch/cvl/DIV2K/.
Wang H., et al., "AHG11: Neural Network-Based In-Loop Filter", JVET-T0079-v3, Joint Video Experts Team (JVET) of ITU-T SG 16 WP 3 and ISO/IEC JTC 1/SC 29, 20th Meeting, by teleconference, Oct. 7-16, 2020, pp. 1-10.
Wang H., et al., "AHG11: Neural Network-Based In-Loop Filter Performance with No Deblocking Filtering Stage", JVET-U0115-v2, Joint Video Experts Team (JVET) of ITU-T SG 16 WP 3 and ISO/IEC JTC 1/SC 29, 21st Meeting, by teleconference, Jan. 6-15, 2021, pp. 1-5.
Wang H., et al., "EE: Tests on Neural Network-Based In-Loop Filter", JVET-U0094-v2, Joint Video Experts Team (JVET) of ITU-T SG 16 WP 3 and ISO/IEC JTC 1/SC 29, 21st Meeting, by teleconference, Jan. 6-15, 2021, pp. 1-9.
Woon-Sung P., et al., "CNN-Based in-Loop Filtering for Coding Efficiency Improvement", 2016 IEEE 12th Image, Video, and Multidimensional Signal Processing Workshop (IVMSP), IEEE, Jul. 11, 2016 (Jul. 11, 2016), pp. 1-5, XP032934608, DOI:10.1109/IVMSPW.2016.7528223 [retrieved on Aug. 1, 2016].

\* cited by examiner

ACTIVATION FUNCTION DESIGN IN NEURAL NETWORK-BASED FILTERING PROCESS FOR VIDEO CODING

This application is a continuation of U.S. patent application Ser. No. 17/489,459, filed Sep. 29, 2021, which claims the benefit of U.S. Provisional Patent Application 63/085,936, filed Sep. 30, 2020. The entire contents U.S. patent application Ser. No. 17/489,459 and U.S. Provisional Patent Application 63/085,936 are incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques related to filtering process for distorted pictures. The filtering process may be based on neural network technologies. For example, the filtering process may apply a convolutional neural network (CNN)-based filter to a reconstructed block of video data. The CNN-based filter may use a Leaky Rectified Linear Unit (ReLU) activation function. Use of the LeakyReLU activation function may lead to better performance than the Rectified Linear Unit (ReLU) activation function and greater stability than the Parametric Rectified Linear Unit (PReLU) activation function during training. The filtering process may be used in the context of advanced video codecs, such as extensions of Versatile Video Coding (VVC) or the next generation of video coding standards, and any other video codecs.

In one example, this disclosure describes a method of coding video data, the method comprising: reconstructing a block of the video data; and applying a Convolutional Neural Network (CNN)-based filter to the reconstructed block, wherein the CNN-based filter uses a LeakyReLU activation function.

In another example, a device for coding video data comprises a memory to store the video data; and one or more processors implemented in circuitry, the one or more processors configured to: reconstruct a block of the video data; and apply a Convolutional Neural Network (CNN)-based filter to the reconstructed block, wherein the CNN-based filter uses a LeakyReLU activation function.

In another example, this disclosure describes a device for coding video data, the device comprising: means for reconstructing a block of the video data; and means for applying a Convolutional Neural Network (CNN)-based filter to the reconstructed block, wherein the CNN-based filter uses a LeakyReLU activation function.

In another example, this disclosure describes a computer-readable storage medium having stored thereon instructions that, when executed, cause one or more processors to: reconstruct a block of the video data; and apply a Convolutional Neural Network (CNN)-based filter to the reconstructed block, wherein the CNN-based filter uses a LeakyReLU activation function.

The details of one or more examples are set forth in the accompanying drawings and the description below. Other features, objects, and advantages will be apparent from the description, drawings, and claims.

DETAILED DESCRIPTION

Video encoders and video decoders may implement in-loop filters that may improve the quality of reconstructed pictures. Common types of in-loop filters include deblocking filters and adaptive loop filters (ALFs). Recently, neural network (NN) based filters have been proposed. NN-based filters include a neural network that takes blocks of a reconstructed picture as input. The neural network outputs filtered blocks.

Neural network-based filters may include an input layer, one or more hidden layers, and an output layer. The layers may include a set of neurons that receive input and generate output. The input layer and each of the hidden layers is associated with an activation function that is applied to outputs of the neurons of the layer. Rectified Linear Unit (ReLU) and Parametric ReLU (PReLU) are examples of activation functions. The activation function used in the neural network may have a significant impact on the performance and trainability of the neural network. For example, PReLU may have better performance than ReLU. However, PReLU may make a training process of the neural network unstable because PReLU itself includes a trainable variable that may become extreme.

This disclosure describes techniques that may address these technical problems with previously proposed NN-based filters in video coding. For example, a video coder (e.g., a video encoder or a video decoder) may reconstruct a block of video data. Additionally, the video coder may apply a Convolutional Neural Network (CNN)-based filter to the reconstructed block. The CNN-based filter uses a LeakyReLU activation function. Use of the LeakyReLU activation function may enable the CNN-based filter to have better performance than PReLU while avoiding instability during the training process. Use of the LeakyReLU activation function, as opposed to other types of activation functions, is based on the specific characteristics exhibited during filtering of the reconstructed pictures, and may bring unexpected, significant improvements in video coding in terms of both the performance and stability.

Figure 1:
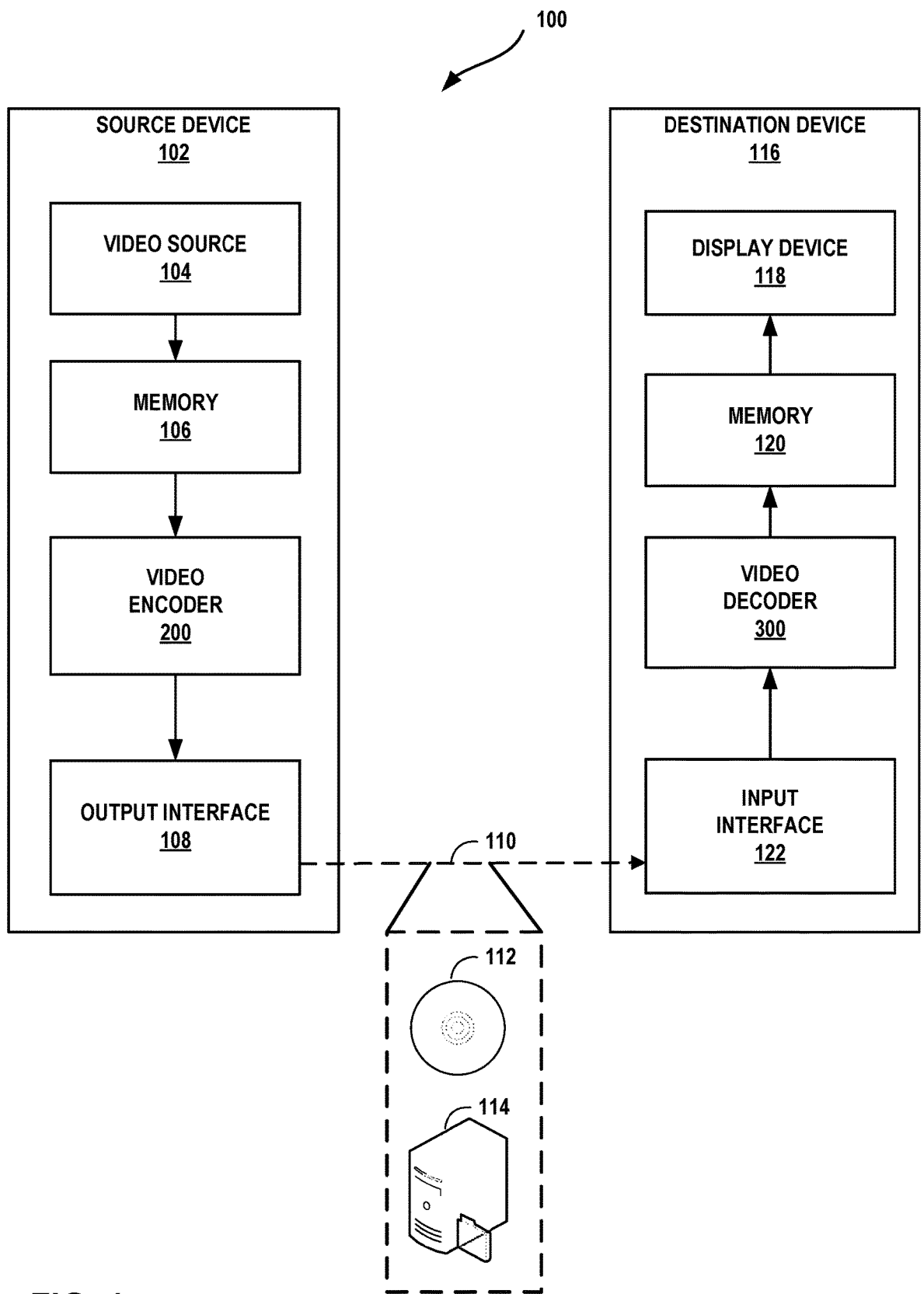
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for using neural network-based filters. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for using neural network-based filters. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). Version 1 of VVC specification has been finalized (referred as VVC FDIS hereinafter) is available from http://phenix.int-evry.fr/jvet/doc_end_user/documents/19_Teleconference/wg11/JVET-S2001-v17.zip. The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an rn-bit value during quantization, where n is greater than rn. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
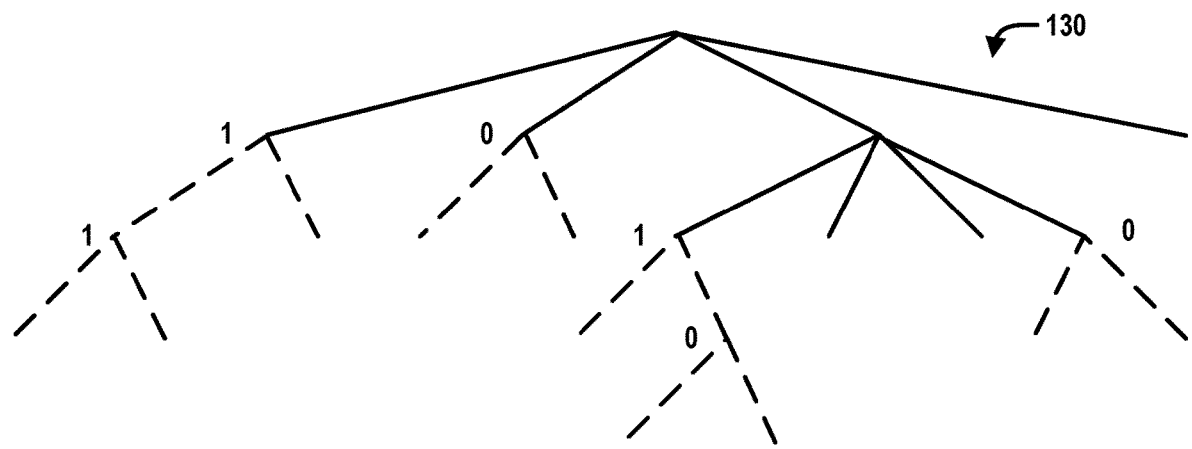
FIGS. 2A and 2B are conceptual diagrams illustrating an example quadtree binary tree (QTBT) structure, and a corresponding coding tree unit (CTU).
Figure 2B:
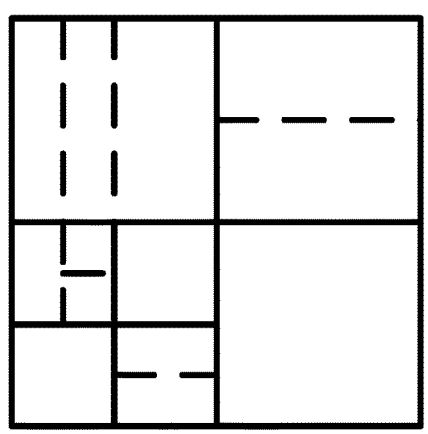

FIGS. 2A and 2B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, because quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the quadtree leaf node is 128×128, the leaf quadtree node will not be further split by the binary tree, because the size exceeds the MaxBTSize (i.e., 64×64, in this example). Otherwise, the quadtree leaf node will be further partitioned by the binary tree. Therefore, the quadtree leaf node is also the root node for the binary tree and has the binary tree depth as 0. When the binary tree depth reaches MaxBTDepth (4, in this example), no further splitting is permitted. A binary tree node having a width equal to MinBTSize (4, in this example) implies that no further vertical splitting (that is, dividing of the width) is permitted for that binary tree node. Similarly, a binary tree node having a height equal to MinBTSize implies no further horizontal splitting (that is, dividing of the height) is permitted for that binary tree node. As noted above, leaf nodes of the binary tree are referred to as CUs, and are further processed according to prediction and transform without further partitioning.

Figure 3:
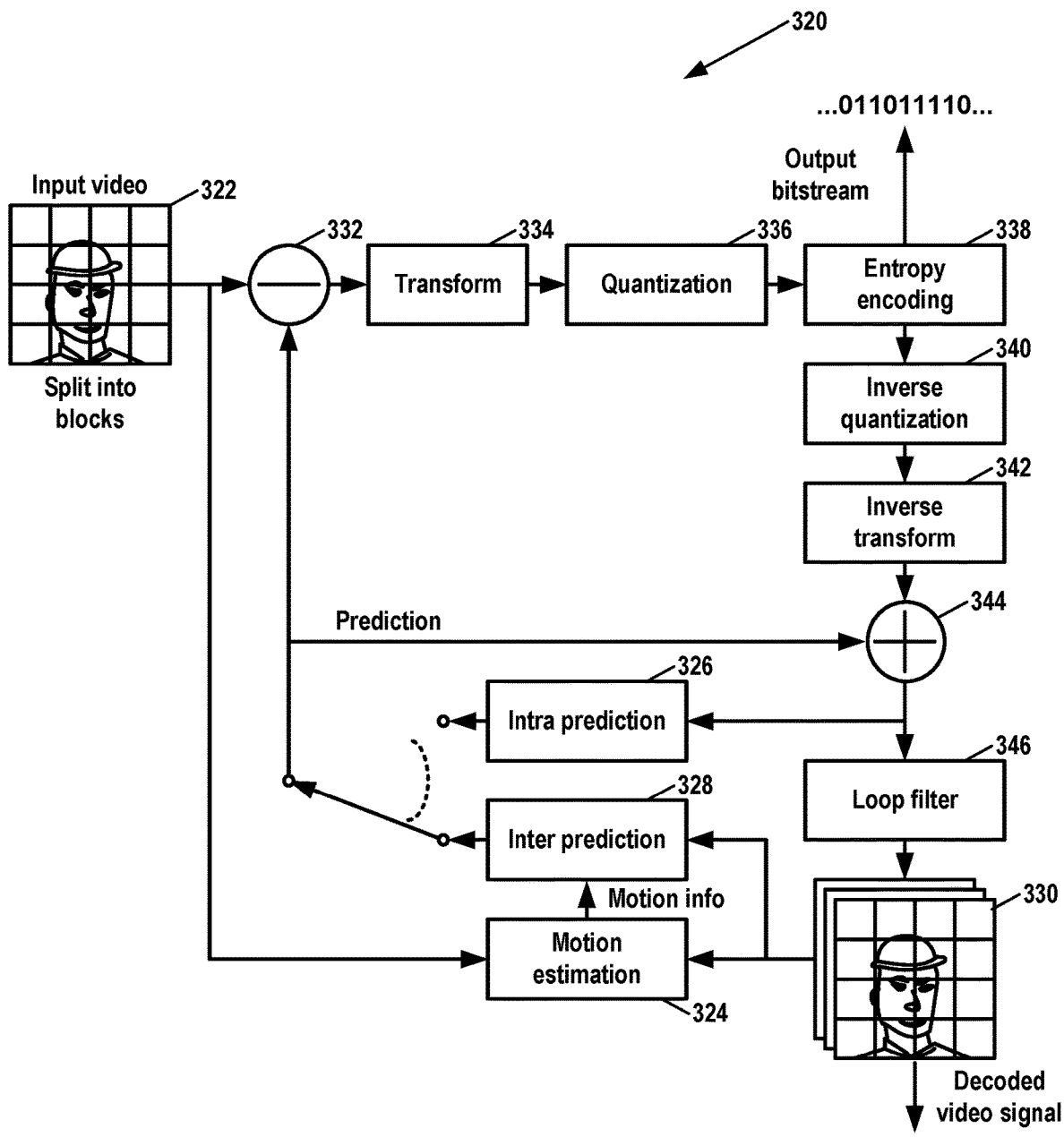
FIG. 3 is a block diagram illustrating an example hybrid video coding framework.

Most video coding standards since H.261 have been based on the so-called hybrid video coding principle, which is illustrated in FIG. 3. The term hybrid refers to the combination of two means to reduce redundancy in the video signal, i.e., prediction and transform coding with quantization of the prediction residual. Whereas prediction and transforms reduce redundancy in the video signal by decorrelation, quantization decreases the data of the transform coefficient representation by reducing their precision, ideally by removing only irrelevant details. This hybrid video coding design principle is also used in the two most recent standards HEVC and VVC.

A modern hybrid video coder may be composed of the following building blocks as shown in the example of FIG. 3. In other words, FIG. 3 is a block diagram illustrating an example hybrid video coding framework 320. In the example of FIG. 3, framework 320 receives a picture 322 of input video data and splits picture 322 into blocks. Block partitioning is used to divide the image into smaller blocks for operation of the prediction and transform processes. Early video coding standards used a fixed block size, typically 16×16 samples. Recent standards such as HEVC and VVC employ tree-based partitioning structures to provide flexible partition, e.g., as illustrated in FIGS. 2A and 2B.

Framework 320 includes a motion estimation unit 324, an intra prediction unit 326, and an inter prediction unit 328. Motion estimation unit 324 may perform motion estimation based on previously reconstructed pictures 330 of the video data. Inter prediction unit 328 may use motion information generated by motion estimation unit 324 to generate a prediction block. Motion-compensated prediction or inter-picture prediction (i.e., inter prediction) takes advantage of the redundancy that exists between (hence "inter") pictures of a video sequence. In block-based motion compensation, which is used in modern video codecs, the prediction is attained from one or more previously decoded pictures, i.e., the reference picture(s). The corresponding areas to generate the inter prediction are indicated by the motion information, including motion vectors and reference picture indices.

Intra prediction unit 326 may use intra prediction to generate a prediction block. Intra-picture prediction exploits the spatial redundancy that exists within a picture (hence "intra") by deriving the prediction for a block from already coded/decoded, spatially neighboring (reference) samples. Directional angular prediction, DC prediction and plane or planar prediction are used in the most recent video codec, including AVC, HEVC and VVC. Framework 320 may select between the prediction block generated by inter prediction unit 328 and the prediction block generated by intra prediction unit 326.

A residual generation unit 332 of framework 320 may generate residual data based on the prediction block and a corresponding block of picture 322. A transform unit 334 may apply a transform to the residual data to generate transform coefficients. Hybrid video coding standards apply a block transform to the prediction residual (regardless of whether the prediction residual comes from inter- or intra-picture prediction). In early standards including H.261/262/263, discrete cosine transform (DCT) is employed. In HEVC and VVC, more transform kernels besides DCT may be applied in order to account for different statistics in specific video signals.

A quantization unit 336 may then apply quantization to the transform coefficients. Quantization aims to reduce the precision of an input value or a set of input values in order to decrease the amount of data needed to represent the values. In hybrid video coding, quantization is typically applied to individual transformed residual samples, i.e., to transform coefficients, resulting in integer coefficient levels. In recent video coding standards, step size used in quantization is derived from a so-called quantization parameter (QP) that controls the fidelity and bit rate. A larger step size lowers the bit rate but also deteriorates the quality, which may result in video pictures exhibiting blocking artifacts and blurred details.

An entropy encoding unit 338 may apply entropy encoding to syntax elements representing the transform coefficients. Framework 320 may output the entropy encoded syntax elements in a bitstream. Entropy coding techniques, such as context-adaptive binary arithmetic coding (CABAC), may be used in recent video codecs, e.g., AVC, HEVC and VVC, due to its high efficiency.

Additionally, in the example of FIG. 3, an inverse quantization unit 340 may inverse quantize the transform coefficients. An inverse transform unit 342 may apply an inverse transform to the inverse quantized transform coefficients to generate residual data. A reconstruction unit 344 may reconstruct the block based on the prediction block and the residual data. A loop filter unit 346 may apply one or more filters to a picture containing the reconstructed block.

Figure 4:
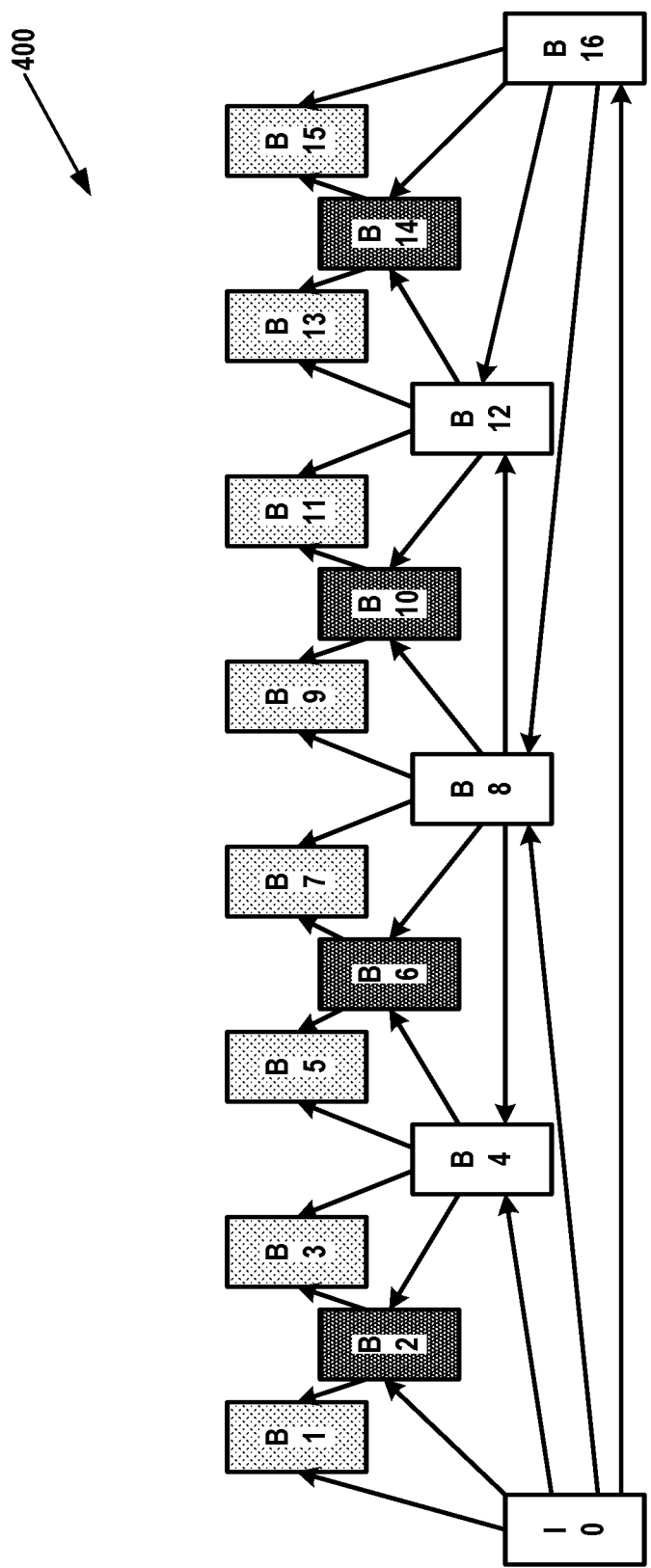
FIG. 4 is a conceptual diagram illustrating example hierarchical prediction structures with Group of Pictures (GOP) size equal to 16.

In recent video codecs, hierarchical prediction structures inside a group of pictures (GOP) are applied to improve coding efficiency. FIG. 4 is a conceptual diagram illustrating an example hierarchical prediction structure 400 with Group of Pictures (GOP) size equal to 16. In the example of FIG. 4, picture I0 is an intra picture that is not encoded using inter prediction. Other pictures in FIG. 4 (i.e., pictures B1 through B16) may be encoded using inter prediction. Specifically, each arrow in FIG. 4 pointing from a first picture to a second picture signifies that the second picture may be encoded using the first picture.

Post-loop/in-loop filtering is a filtering process (or combination of such processes) that is applied to the reconstructed picture to reduce the coding artifacts. The input of the filtering process is generally the reconstructed picture, which is the combination of the reconstructed residual signal (which includes quantization error) and the prediction. As shown in FIG. 3, the reconstructed pictures 330 after in-loop filtering are stored and used as a reference for inter-picture prediction of subsequently coded pictures. The coding artifacts are mostly determined by the QP, therefore QP information is generally used in design of the filtering process. In HEVC, the in-loop filters include deblocking filtering and sample adaptive offset (SAO) filtering. In VVC, an adaptive loop filter (ALF) was introduced as a third filter. The filtering process of ALF is as shown below, $$R'(i,j)=R(i,j)+((\Sigma_{k\neq 0}\Sigma_{l\neq 0}f(k,l)\times K(R(i+k,j+l)-R(i,j),c(k,l))+64)>>7) \quad (1)$$

In equation (1), R(i,j) is a sample before application of the filtering process, R'(i,j) is the sample value after application of the filtering process, f(k,l) denotes the filter coefficients, K(x,y) is the clipping function and c(k,l) denotes the clipping parameters. The variables k and l vary between $$-\frac{L}{2} \text{ and } \frac{L}{2}$$

where L denotes the filter length. The clipping function K(x,y)=min(y, max(−y,x)), which corresponds to the function Clip3 (−y,y,x). The clipping operation introduces non-linearity to make ALF more efficient by reducing the impact of neighbor sample values that are too different with the current sample value. In VVC, the filtering parameters can be signaled in the bitstream or the filtering parameters can be selected from the pre-defined filter sets. The ALF filtering process can also be summarized as following equation.

$$R'(i,j)=R(i,j)+\text{ALF\_residual\_ouput}(R) \quad (2)$$

Several works show that embedding neural networks (NNs) into a hybrid video coding framework can improve compression efficiency. Neural networks have been used in modules for intra prediction and inter prediction to improve the prediction efficiency. NN-based in-loop filters have also been an active research topic in recent years. In some examples, the filtering process is applied as a post-filter. In cases where the filtering process is applied as a post-filter, the filtering process is only applied to the output picture and the unfiltered picture is used as a reference picture. In contrast, when the filtering process is applied as an in-loop filter, the filtering process is applied to reconstructed pictures that are used for output and used as reference pictures.

An NN-based filter can be applied additionally on top of the existing filters such as a deblocking filter, SAO, or ALF. The NN-based filter can also be applied exclusively, where the NN-based filter is designed to replace all the existing filters.

Figure 5:
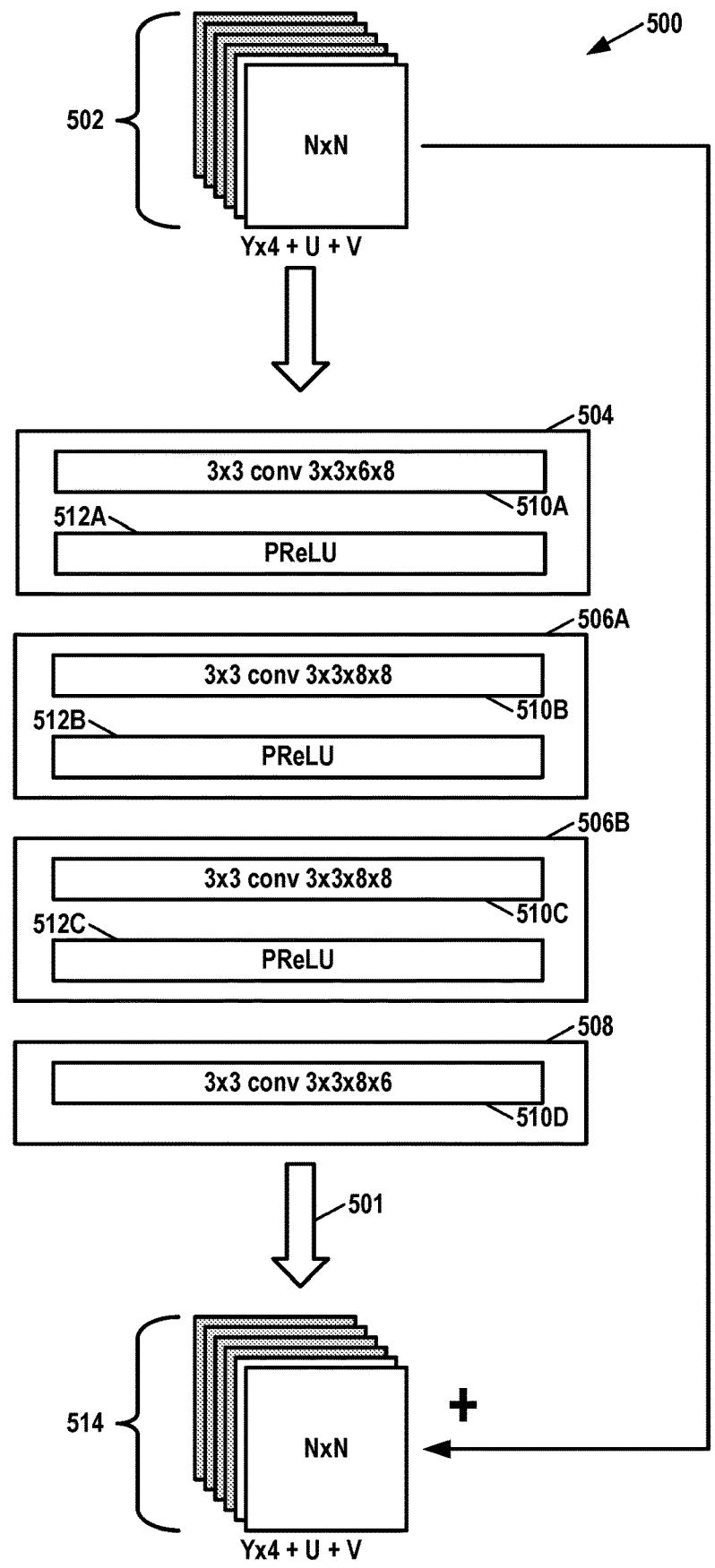
FIG. 5 is a conceptual diagram illustrating a Convolutional Neural Network (CNN)-based filter with four layers.

FIG. 5 is a conceptual diagram illustrating a Convolutional Neural Network (CNN)-based filter 500 with four layers. CNN-based filter 500 is a specific type of NN-based filter that uses convolutional layers. As shown in FIG. 5, an NN-based filtering process may take reconstructed samples as inputs, and intermediate outputs 501 are residual samples, which are added back to the input to refine the input samples. The CNN-based filter 500 may use all color components (e.g., luma, Cb chroma, Cr chroma) as input to exploit cross-component correlations. The different color components may share the same filters (including network structure and model parameters) or each color component may have its own specific filters.

Specifically, inputs to CNN-based filter 500 include a plurality of sample blocks 502 of a reconstructed picture. Each of sample blocks 502 has a size N×N. Sample blocks 502 are rectangular arrays of samples. Sample blocks 502 may or may not correspond to coding blocks, prediction blocks, transform blocks, coding tree blocks, or other types of blocks used in the coding process. The present disclosure is, however, not limited to square sample blocks but may generally be applied to rectangular sample blocks with a size N×M. Chroma blocks have half as many samples in the vertical direction and half as many samples in a horizontal direction as luma blocks. Accordingly, for each N×N chroma block, the inputs to filter 500 may include four N×N luma blocks. In the example of FIG. 5, the luma blocks are shaded and the chroma blocks are white. Thus, sample blocks received as input to filter 500 may be expressed as Y×4+U+V, where Y corresponds to luma, U corresponds to a first chroma component, and V corresponds to a second chroma component.

Furthermore, CNN-based filter 500 includes an input layer 504, hidden layers 506A through 506B (collectively, "hidden layers 506"), and an output layer 508. Specifically, in the example of FIG. 5, CNN-based filter 500 includes 2 hidden layers for a total of 4 layers. Each of input layer 504, hidden layers 506, and output layer 508 includes one of convolutional layers 510A through 510D (collectively, "convolutional layers 510"). Additionally, input layer 504 and each of hidden layers 506 includes one of PReLU activation layers 512A through 512C (collectively, "PReLU activation layers 512"). Each of PReLU activation layers 512 takes output of a convolutional layer as input and applies the PReLU activation function to the input.

Throughout this disclosure, the notation a×b×c×d is used to describe a convolutional layer. The values a and b may correspond to a width and a height of a 2-dimensional array of input locations. Each of the input locations has c input channels. Therefore, the convolutional layer receives a×b×c input values. The value d indicates the number of output channels of the convolutional layer. Each output channel corresponds to a different set of trainable weights applied by the convolutional layer. The number of weights in the set of weights corresponding to an output channel is equal to a×b×c. A value of an output channel (i.e., an output value) may be computed by convolving the input values and the set of weights corresponding to the output channel. For instance, the value of an output channel may be computed as a dot product of the input values and the set of weights corresponding to the output channel. Because there are d output channels, the convolutional layer is associated with a×b×c×d weights.

To illustrate this with respect to the example of FIG. 5, convolutional layer 510A is described as 3×3×6×8. Thus, the input of convolutional layer 510A may be the set of 6 values corresponding to each chroma-sample location in a 3×3 square of chroma-sample locations centered around a current chroma-sample location. Each chroma-sample location corresponds to a location of a chroma sample in blocks 502. In this example, the chroma blocks are half the width and half the height of the luma blocks. Thus, there are four luma-sample locations for each chroma-sample location. There are two types of chroma samples for each chroma-sample location, resulting in 6 sample values for each chroma-sample location. Convolutional layer 510A has 8 output channels and therefore generates 8 output values. In the example of FIG. 5, PReLU activation layer 512A applies the PReLU activation function to the 8 output values generated by convolutional layer 510A. Convolutional layer 510A may repeat this operation with all or some of the chroma-sample locations of blocks 502 as the current chroma-sample location. The set of 8 values output by PReLU activation layer 512A may be treated as values corresponding to a single location in a 2-dimensional array of locations used as input for convolutional layer 510B. Convolutional layers 510B, 510C, and 510D operate in a similar manner. Convolutional layer 510D has 6 output channels, corresponding to the 6 sample values (i.e., 4 luma and 2 chroma) corresponding to the current chroma sample location. In other examples, convolutional layer 510A may have different values of a, b, c, and d than 3, 3, 6, and 8. In other words, the present disclosure is, however, not limited to a filter kernel of 3×3 chroma-sample locations but may be applied to general a×b filter kernels, including non-square filter kernels. Furthermore, padding may be used at block boundaries, CTU boundaries, and/or picture boundaries.

Output layer 508 of CNN-based filter 500 generates intermediate outputs 501. Intermediate outputs 501 may include residual samples. These residual samples may be different from the residual samples generated by residual generation unit 332. CNN-based filter 500 generates filtered blocks 514 by adding residual samples of intermediate outputs 501 to corresponding samples of sample blocks 502. Filtered blocks 514 may include two chroma blocks of size N×N and four luma blocks of size N×N.

The filtering process of FIG. 5 can be generalized as follows:

$$R'(i,j) = R(i,j) + NN\_filter\_residual\_ouput(R) \quad (3)$$

Figure 6A:
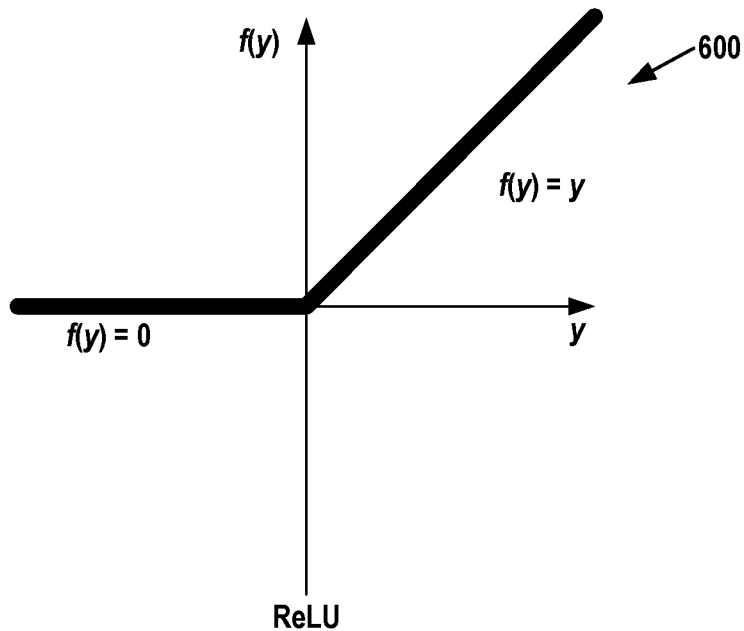
FIG. 6A is a conceptual diagram illustrating a ReLU activation function.

FIG. 6A is α conceptual diagram illustrating a ReLU activation function 600. As shown in FIG. 6A, ReLU activation function 600 may be defined as:

$$f(y) = \begin{cases} 0, & y < 0 \\ y, & y \geq 0 \end{cases} \quad (4)$$

Figure 6B:
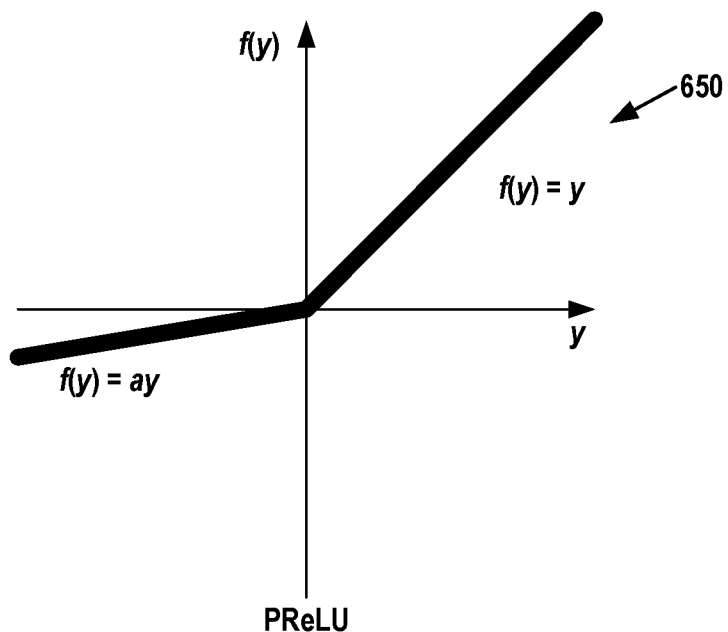
FIG. 6B is a conceptual diagram illustrating a PReLU activation function.

FIG. 6B is a conceptual diagram illustrating a PReLU activation function 650. As shown in FIG. 6B, PReLU activation function 650 may be defined as:

$$f(y) = \begin{cases} a * y, & y < 0 \\ y, & y \geq 0 \end{cases} \quad (5)$$

In equation 5, a is a value that is trained as part of training a neural network that includes the PReLU activation function.

The model structures and model parameters of NN-based filters can be pre-defined and be stored at video encoder 200 and video decoder 300. The model structures and model parameters of NN-based filters can also be signaled in the bitstream (e.g., by video encoder 200). For instance, video encoder 200 may encode, and video decoder 300 may decode, one or more syntax elements having values that indicate the model structure and model parameters (e.g., of NN-based filters). Video encoder 200 may encode the syntax elements in any suitable syntax structure, such as a sequence parameter set (SPS), a picture parameter set (PPS), a video parameter set (VPS), a slide header, etc.

It has been found that the performance of PReLU is better than ReLU in most cases. However, PReLU sometimes also makes the training process unstable. Thus, training of a NN-based filter that uses PReLU activation functions may take longer or may diverge from an optimal solution.

In this disclosure, it is proposed to use LeakyReLU as an activation function in an NN-based filtering process. LeakyReLU is shown in equation (6), below.

$$f(y) = \begin{cases} \text{Alpha} * y, & y < 0 \\ y, & y \geq 0 \end{cases} \quad (6)$$

In equation (6), the parameter Alpha is a fixed value. In other words, the parameter Alpha does not change during a training process of a neural network that includes the LeakyReLU activation function. In contrast, the parameter a in PReLU is a trainable variable that can change during the training process.

Figure 7:
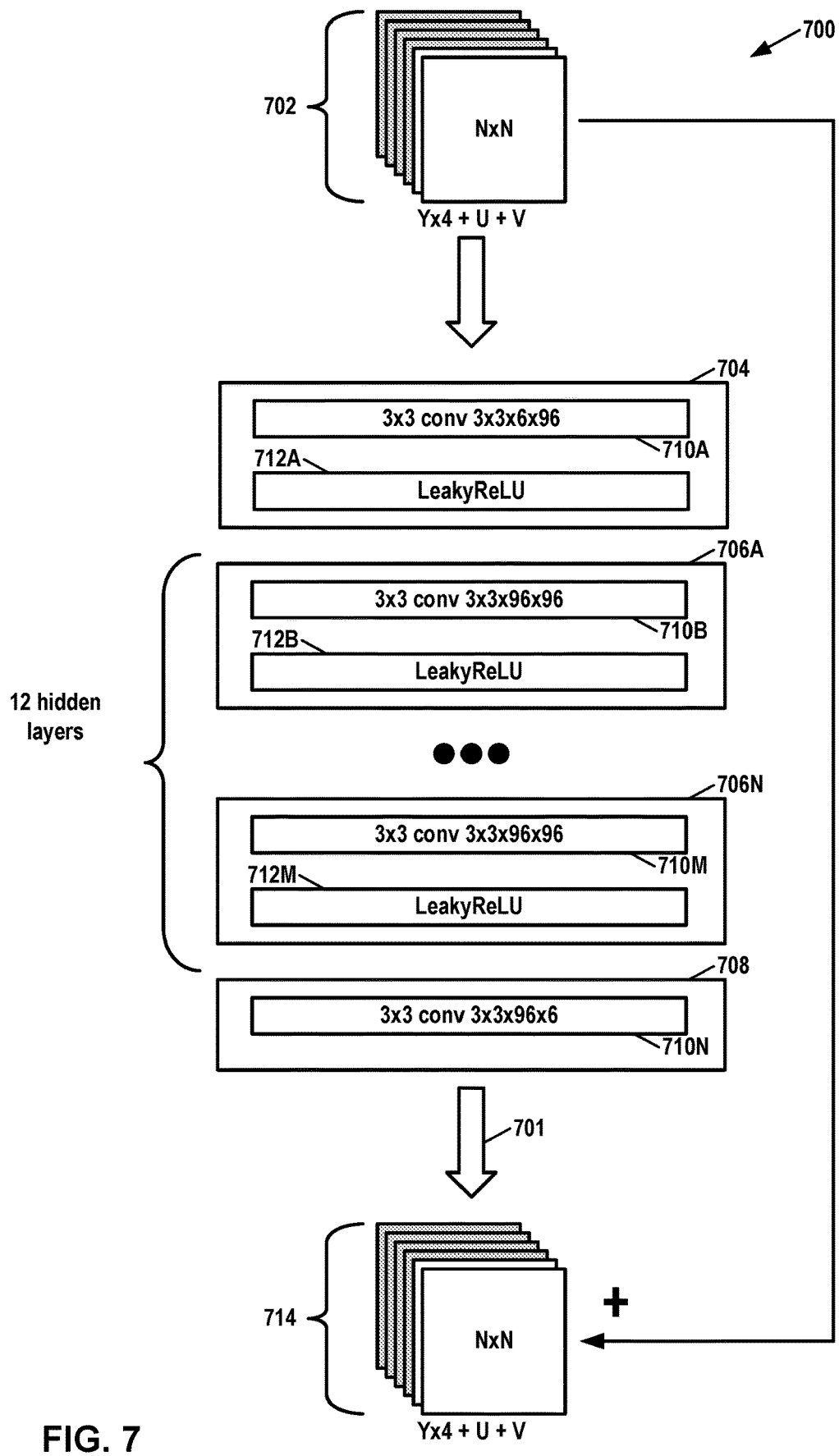
FIG. 7 is a conceptual diagram illustrating an example CNN-based filter with 14 layers and LeakyReLU as an activation function, in accordance with one or more techniques of this disclosure.

As one example, a CNN-based filter shown in the example of FIG. 7 is proposed. FIG. 7 is a conceptual diagram illustrating an example CNN-based filter 700 with 14 layer and leaky ReLU as an activation function, in accordance with one or more techniques of this disclosure. In the example of FIG. 7, inputs to CNN-based filter 700 include a plurality of sample blocks 702 of a reconstructed picture. In some examples, each of sample blocks 702 may be a square sample block with size N×N. The present disclosure is, however, not limited to square sample blocks but may generally be applied to rectangular sample blocks with a size N×M. In the example of FIG. 7, chroma blocks have half as many samples in the vertical direction and half as many samples in a horizontal direction as luma blocks. Accordingly, for each N×N chroma block, the inputs to CNN-based filter 700 may include four N×N luma blocks. In the example of FIG. 7, the luma blocks are shaded and the chroma blocks are white. Thus, sample blocks 702 received as input to filter 700 may be expressed as Y×4+U+V, where Y corresponds to luma, U corresponds to a first chroma component, and V corresponds to a second chroma component.

Furthermore, CNN-based filter 700 includes an input layer 704, hidden layers 706A through 706N (collectively, "hidden layers 706"), and an output layer 708. Specifically, in the example of FIG. 7, CNN-based filter 700 includes 12 hidden layers for a total of 14 layers. In other examples, CNN-based filter 700 may have a quantity of layers that is greater than or less than 14. Each of input layer 704, hidden layers 706, and output layer 708 includes one of convolutional layers 710A through 710N (collectively, "convolutional layers 710"). Additionally, input layer 704 and each of hidden layers 706 includes one of LeakyReLU activation layers 712A through 712M (collectively, "LeakyReLU activation layers 712"). Each of LeakyReLU activation layers 712 takes output of a convolutional layer as input and applies the LeakyReLU activation function to the input.

Output layer 708 of CNN-based filter 700 generates intermediate outputs 701. Intermediate outputs 701 may include residual samples. These residual samples may be different from the residual samples generated by residual generation unit 332. CNN-based filter 700 generates filtered blocks 714 by adding residual samples of intermediate outputs 701 to corresponding samples of sample blocks 702. Filtered blocks 714 may include two chroma blocks of size N×N and four luma blocks of size N×N.

In one example, an optimal value of Alpha is attained by statistics of the trainable value of PReLU, and the same Alpha value is used for all layers. For instance, video encoder 200 and video decoder 300 may use the same predetermined value of Alpha in all of LeakyReLU activation layers 712 of CNN-based filter 700. In this example, it may not be necessary for video encoder 200 to signal the value of Alpha in the bitstream. In some examples, to obtain the optimal value of Alpha based on the statistics of the value of the trainable value (e.g., a) of PReLU, a system (e.g., by video encoder 200, video decoder 300, or another device or system) may train a network using the PReLU activation function until training has converged. The system may then use statistics regarding the trainable values (e.g., α) of the PReLU activation functions of each layer. For instance, the system may determine the optimal value of Alpha as an average of the trainable values of the PReLU activation function of the layers.

As another example, an optimal value of Alpha is attained by the statistics of the value of trainable value of PReLU for each layer, each layer may use its own fixed Alpha value. For example, for each of LeakyReLU activation layers 712, video encoder 200 and video decoder 300 may use the same predetermined layer-specific value of Alpha in the LeakyReLU activation layer, but different predetermined values of Alpha may be used in different LeakyReLU activation layers 712. In this example, it may not be necessary for video encoder 200 to signal the values of Alpha in the bitstream. In some examples, to obtain the optimal value of Alpha based on the statistics of the value of the trainable value (e.g., a) of PReLU for each layer, a system (e.g., by video encoder 200, video decoder 300, or another device or system) may train a network using the PReLU activation function until training has converged. The system may then use statistics regarding the trainable values (e.g., a) of the PReLU activation functions of each layer. For example, the system may determine the optimal value of Alpha for a layer as being equal to the trainable value of the PReLU activation function of the corresponding layer. In another example, the system may determine the optimal value of Alpha for a layer as being equal to an average of two or more of the trainable values of the PReLU activation function of two or more of the layers.

As another example, the value of Alpha in a NN-based filter (e.g., CNN-based filter 700) is a parameter that can be specified when applying the NN-based filter to pictures. For instance, in one possible use case involving video coding, at the encoder side, video encoder 200 makes decisions about what Alpha values should be used. For instance, video encoder 200 may apply the NN-based filter with a plurality of different predetermined Alpha values and select which one of the Alpha values yields the best results. Video encoder 200 may determine which Alpha value yields the best results by comparing (e.g., with a sum of absolute differences, etc.) the reconstructed blocks or picture generated using the different Alpha values. Furthermore, video encoder 200 may encode the information needed to derive the Alpha values as syntax elements in the bitstream. Video decoder 300 reconstruct the Alpha values selected by video encoder 200 and performs the filtering process. Examples of ways to signal Alpha values include signaling the Alpha values in the bitstream or signaling an index of the selected Alpha values inside a pre-defined set. A typical value of Alpha value can be ¼, though other values may be possible.

Figure 8:
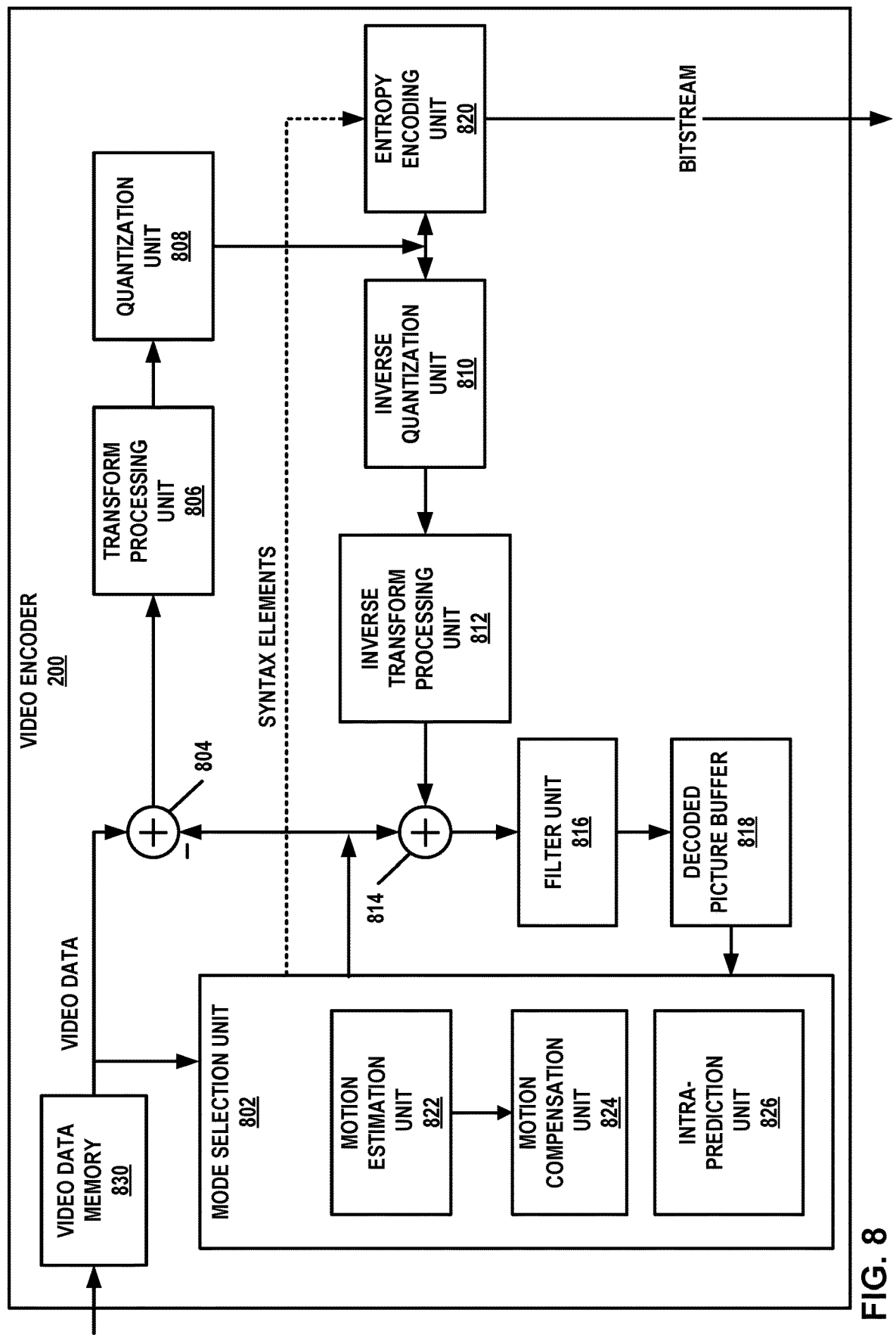
FIG. 8 is a block diagram illustrating an example video encoder that may perform the techniques of this disclosure.

FIG. 8 is a block diagram illustrating an example video encoder 200 that may perform the techniques of this disclosure. FIG. 8 is provided for purposes of explanation and should not be considered limiting of the techniques as broadly exemplified and described in this disclosure. For purposes of explanation, this disclosure describes video encoder 200 according to the techniques of VVC (ITU-T H.266) and HEVC (ITU-T H.265). However, the techniques of this disclosure may be performed by video encoding devices that are configured to other video coding standards.

In the example of FIG. 8, video encoder 200 includes video data memory 830, mode selection unit 802, residual generation unit 804, transform processing unit 806, quantization unit 808, inverse quantization unit 810, inverse transform processing unit 812, reconstruction unit 814, filter unit 816, decoded picture buffer (DPB) 818, and entropy encoding unit 820. Any or all of video data memory 830, mode selection unit 802, residual generation unit 804, transform processing unit 806, quantization unit 808, inverse quantization unit 810, inverse transform processing unit 812, reconstruction unit 814, filter unit 816, DPB 818, and entropy encoding unit 820 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 830 may store video data to be encoded by the components of video encoder 200. Video encoder 200 may receive the video data stored in video data memory 830 from, for example, video source 104 (FIG. 1). DPB 818 may act as a reference picture memory that stores reference video data for use in prediction of subsequently coded video data by video encoder 200. Video data memory 830 and DPB 818 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 830 and DPB 818 may be provided by the same memory device or separate memory devices. In various examples, video data memory 830 may be on-chip with other components of video encoder 200, as illustrated, or off-chip relative to those components.

In this disclosure, reference to video data memory 830 should not be interpreted as being limited to memory internal to video encoder 200, unless specifically described as such, or memory external to video encoder 200, unless specifically described as such. Rather, reference to video data memory 830 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 8 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 830 is configured to store received video data. Video encoder 200 may retrieve a picture of the video data from video data memory 830 and provide the video data to residual generation unit 804 and mode selection unit 802. Video data in video data memory 830 may be raw video data that is to be encoded.

Mode selection unit 802 includes a motion estimation unit 822, a motion compensation unit 824, and an intra-prediction unit 826. Mode selection unit 802 may include additional functional units to perform video prediction in accordance with other prediction modes. As examples, mode selection unit 802 may include a palette unit, an intra-block copy unit (which may be part of motion estimation unit 822 and/or motion compensation unit 824), an affine unit, a linear model (LM) unit, or the like.

Mode selection unit 802 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 802 may ultimately select the combination of encoding parameters having rate-distortion values that are better than the other tested combinations.

Video encoder 200 may partition a picture retrieved from video data memory 830 into a series of CTUs, and encapsulate one or more CTUs within a slice. Mode selection unit 802 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 802 also controls the components thereof (e.g., motion estimation unit 822, motion compensation unit 824, and intra-prediction unit 826) to generate a prediction block for a current block (e.g., a current CU, or in HEVC, the overlapping portion of a PU and a TU). For inter-prediction of a current block, motion estimation unit 822 may perform a motion search to identify one or more closely matching reference blocks in one or more reference pictures (e.g., one or more previously coded pictures stored in DPB 818). In particular, motion estimation unit 822 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 822 may generally perform these calculations using sample-by-sample differences between the current block and the reference block being considered. Motion estimation unit 822 may identify a reference block having a lowest value resulting from these calculations, indicating a reference block that most closely matches the current block.

Motion estimation unit 822 may form one or more motion vectors (MVs) that defines the positions of the reference blocks in the reference pictures relative to the position of the current block in a current picture. Motion estimation unit 822 may then provide the motion vectors to motion compensation unit 824. For example, for uni-directional inter-prediction, motion estimation unit 822 may provide a single motion vector, whereas for bi-directional inter-prediction, motion estimation unit 822 may provide two motion vectors. Motion compensation unit 824 may then generate a prediction block using the motion vectors. For example, motion compensation unit 824 may retrieve data of the reference block using the motion vector. As another example, if the motion vector has fractional sample precision, motion compensation unit 824 may interpolate values for the prediction block according to one or more interpolation filters. Moreover, for bi-directional inter-prediction, motion compensation unit 824 may retrieve data for two reference blocks identified by respective motion vectors and combine the retrieved data, e.g., through sample-by-sample averaging or weighted averaging.

As another example, for intra-prediction, or intra-prediction coding, intra-prediction unit 826 may generate the prediction block from samples neighboring the current block. For example, for directional modes, intra-prediction unit 826 may generally mathematically combine values of neighboring samples and populate these calculated values in the defined direction across the current block to produce the prediction block. As another example, for DC mode, intra-prediction unit 826 may calculate an average of the neighboring samples to the current block and generate the prediction block to include this resulting average for each sample of the prediction block.

Mode selection unit 802 provides the prediction block to residual generation unit 804. Residual generation unit 804 receives a raw, unencoded version of the current block from video data memory 830 and the prediction block from mode selection unit 802. Residual generation unit 804 calculates sample-by-sample differences between the current block and the prediction block. The resulting sample-by-sample differences define a residual block for the current block. In some examples, residual generation unit 804 may also determine differences between sample values in the residual block to generate a residual block using residual differential pulse code modulation (RDPCM). In some examples, residual generation unit 804 may be formed using one or more subtractor circuits that perform binary subtraction.

In examples where mode selection unit 802 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 802 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 802, via respective units associated with the coding techniques, generates a prediction block for the current block being encoded. In some examples, such as palette mode coding, mode selection unit 802 may not generate a prediction block, and instead generate syntax elements that indicate the manner in which to reconstruct the block based on a selected palette. In such modes, mode selection unit 802 may provide these syntax elements to entropy encoding unit 820 to be encoded.

As described above, residual generation unit 804 receives the video data for the current block and the corresponding prediction block. Residual generation unit 804 then generates a residual block for the current block. To generate the residual block, residual generation unit 804 calculates sample-by-sample differences between the prediction block and the current block.

Transform processing unit 806 applies one or more transforms to the residual block to generate a block of transform coefficients (referred to herein as a "transform coefficient block"). Transform processing unit 806 may apply various transforms to a residual block to form the transform coefficient block. For example, transform processing unit 806 may apply a discrete cosine transform (DCT), a directional transform, a Karhunen-Loeve transform (KLT), or a conceptually similar transform to a residual block. In some examples, transform processing unit 806 may perform multiple transforms to a residual block, e.g., a primary transform and a secondary transform, such as a rotational transform. In some examples, transform processing unit 806 does not apply transforms to a residual block.

Quantization unit 808 may quantize the transform coefficients in a transform coefficient block, to produce a quantized transform coefficient block. Quantization unit 808 may quantize transform coefficients of a transform coefficient block according to a quantization parameter (QP) value associated with the current block. Video encoder 200 (e.g., via mode selection unit 802) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 806.

Inverse quantization unit 810 and inverse transform processing unit 812 may apply inverse quantization and inverse transforms to a quantized transform coefficient block, respectively, to reconstruct a residual block from the transform coefficient block. Reconstruction unit 814 may produce a reconstructed block corresponding to the current block (albeit potentially with some degree of distortion) based on the reconstructed residual block and a prediction block generated by mode selection unit 802. For example, reconstruction unit 814 may add samples of the reconstructed residual block to corresponding samples from the prediction block generated by mode selection unit 802 to produce the reconstructed block.

Filter unit 816 may perform one or more filter operations on reconstructed blocks. For example, filter unit 816 may perform deblocking operations to reduce blockiness artifacts along edges of CUs. Operations of filter unit 816 may be skipped, in some examples. In some examples, filter unit 816 may apply a CNN-based filter that uses a LeakyReLU activation function, such as CNN-based filter 700. Thus, in some examples, reconstruction unit 814 may reconstruct a block of a picture, where the block may be a square or rectangular area of the picture and may or may not correspond to a coding block, prediction block, etc. Filter unit 816 may apply CNN-based filter 700 to the block, where CNN-based filter 700 uses a LeakyReLU activation function.

Video encoder 200 stores reconstructed blocks in DPB 818. For instance, in examples where operations of filter unit 816 are not performed, reconstruction unit 814 may store reconstructed blocks to DPB 818. In examples where operations of filter unit 816 are performed, filter unit 816 may store the filtered reconstructed blocks to DPB 818. Motion estimation unit 822 and motion compensation unit 824 may retrieve a reference picture from DPB 818, formed from the reconstructed (and potentially filtered) blocks, to inter-predict blocks of subsequently encoded pictures. In addition, intra-prediction unit 826 may use reconstructed blocks in DPB 818 of a current picture to intra-predict other blocks in the current picture.

In general, entropy encoding unit 820 may entropy encode syntax elements received from other functional components of video encoder 200. For example, entropy encoding unit 820 may entropy encode quantized transform coefficient blocks from quantization unit 808. As another example, entropy encoding unit 820 may entropy encode prediction syntax elements (e.g., motion information for inter-prediction or intra-mode information for intra-prediction) from mode selection unit 802. Entropy encoding unit 820 may perform one or more entropy encoding operations on the syntax elements, which are another example of video data, to generate entropy-encoded data. For example, entropy encoding unit 820 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 820 may operate in bypass mode where syntax elements are not entropy encoded.

Video encoder 200 may output a bitstream that includes the entropy encoded syntax elements needed to reconstruct blocks of a slice or picture. For example, entropy encoding unit 820 may output the bitstream.

The operations described above are described with respect to a block. Such description may be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to reconstruct a block of the video data and apply a CNN-based filter to the block, wherein the CNN-based filter uses a LeakyReLU activation function.

Figure 9:
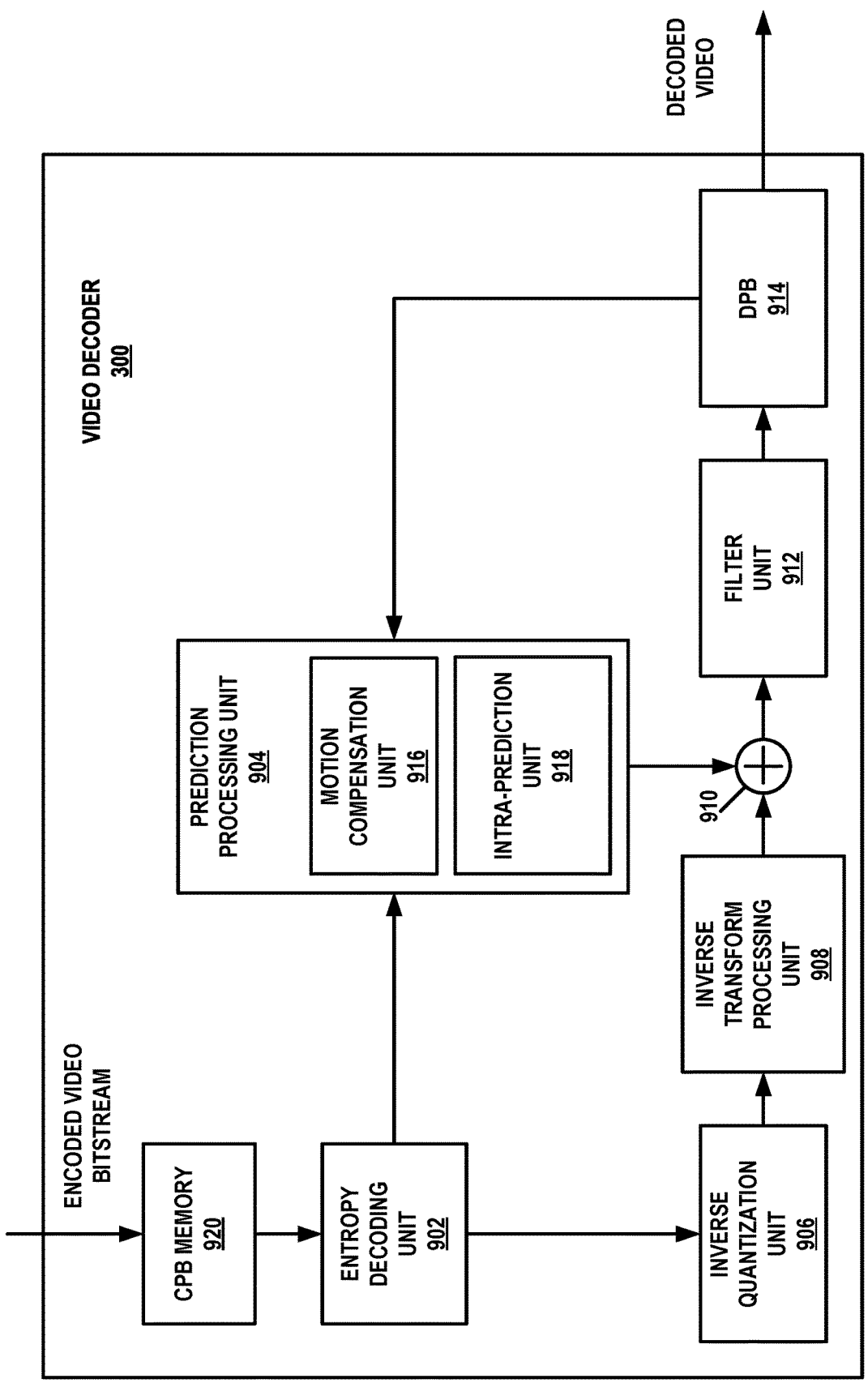
FIG. 9 is a block diagram illustrating an example video decoder that may perform the techniques of this disclosure.

FIG. 9 is a block diagram illustrating an example video decoder 300 that may perform the techniques of this disclosure. FIG. 9 is provided for purposes of explanation and is not limiting on the techniques as broadly exemplified and described in this disclosure. For purposes of explanation, this disclosure describes video decoder 300 according to the techniques of VVC (ITU-T H.266, under development), and HEVC (ITU-T H.265). However, the techniques of this disclosure may be performed by video coding devices that are configured to other video coding standards.

In the example of FIG. 9, video decoder 300 includes coded picture buffer (CPB) memory 920, entropy decoding unit 902, prediction processing unit 904, inverse quantization unit 906, inverse transform processing unit 908, reconstruction unit 910, filter unit 912, and decoded picture buffer (DPB) 914. Any or all of CPB memory 920, entropy decoding unit 902, prediction processing unit 904, inverse quantization unit 906, inverse transform processing unit 908, reconstruction unit 910, filter unit 912, and DPB 914 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 904 includes motion compensation unit 916 and intra-prediction unit 918. Prediction processing unit 904 may include additional units to perform prediction in accordance with other prediction modes. As examples, prediction processing unit 904 may include a palette unit, an intra-block copy unit (which may form part of motion compensation unit 916), an affine unit, a linear model (LM) unit, or the like. In other examples, video decoder 300 may include more, fewer, or different functional components.

CPB memory 920 may store video data, such as an encoded video bitstream, to be decoded by the components of video decoder 300. The video data stored in CPB memory 920 may be obtained, for example, from computer-readable medium 110 (FIG. 1). CPB memory 920 may include a CPB that stores encoded video data (e.g., syntax elements) from an encoded video bitstream. Also, CPB memory 920 may store video data other than syntax elements of a coded picture, such as temporary data representing outputs from the various units of video decoder 300. DPB 914 generally stores decoded pictures, which video decoder 300 may output and/or use as reference video data when decoding subsequent data or pictures of the encoded video bitstream. CPB memory 920 and DPB 914 may be formed by any of a variety of memory devices, such as DRAM, including SDRAM, MRAM, RRAM, or other types of memory devices. CPB memory 920 and DPB 914 may be provided by the same memory device or separate memory devices. In various examples, CPB memory 920 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 920. Likewise, memory 120 may store instructions to be executed by video decoder 300, when some or all of the functionality of video decoder 300 is implemented in software to be executed by processing circuitry of video decoder 300.

The various units shown in FIG. 9 are illustrated to assist with understanding the operations performed by video decoder 300. The units may be implemented as fixed-function circuits, programmable circuits, or a combination thereof. Similar to FIG. 8, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 902 may receive encoded video data from the CPB and entropy decode the video data to reproduce syntax elements. Prediction processing unit 904, inverse quantization unit 906, inverse transform processing unit 908, reconstruction unit 910, and filter unit 912 may generate decoded video data based on the syntax elements extracted from the bitstream. In some examples, filter unit 912 may apply a CNN-based filter that uses a LeakyReLU activation function.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 902 may entropy decode syntax elements defining quantized transform coefficients of a quantized transform coefficient block, as well as transform information, such as a quantization parameter (QP) and/or transform mode indication(s). Inverse quantization unit 906 may use the QP associated with the quantized transform coefficient block to determine a degree of quantization and, likewise, a degree of inverse quantization for inverse quantization unit 906 to apply. Inverse quantization unit 906 may, for example, perform a bitwise left-shift operation to inverse quantize the quantized transform coefficients. Inverse quantization unit 906 may thereby form a transform coefficient block including transform coefficients.

After inverse quantization unit 906 forms the transform coefficient block, inverse transform processing unit 908 may apply one or more inverse transforms to the transform coefficient block to generate a residual block associated with the current block. For example, inverse transform processing unit 908 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 904 generates a prediction block according to prediction information syntax elements that were entropy decoded by entropy decoding unit 902. For example, if the prediction information syntax elements indicate that the current block is inter-predicted, motion compensation unit 916 may generate the prediction block. In this case, the prediction information syntax elements may indicate a reference picture in DPB 914 from which to retrieve a reference block, as well as a motion vector identifying a location of the reference block in the reference picture relative to the location of the current block in the current picture. Motion compensation unit 916 may generally perform the inter-prediction process in a manner that is substantially similar to that described with respect to motion compensation unit 824 (FIG. 8).

As another example, if the prediction information syntax elements indicate that the current block is intra-predicted, intra-prediction unit 918 may generate the prediction block according to an intra-prediction mode indicated by the prediction information syntax elements. Again, intra-prediction unit 918 may generally perform the intra-prediction process in a manner that is substantially similar to that described with respect to intra-prediction unit 826 (FIG. 8).

Intra-prediction unit 918 may retrieve data of neighboring samples to the current block from DPB 914.

Reconstruction unit 910 may reconstruct the current block using the prediction block and the residual block. For example, reconstruction unit 910 may add samples of the residual block to corresponding samples of the prediction block to reconstruct the current block.

Filter unit 912 may perform one or more filter operations on reconstructed blocks. For example, filter unit 912 may perform deblocking operations to reduce blockiness artifacts along edges of the reconstructed blocks. Operations of filter unit 912 are not necessarily performed in all examples. In some examples, filter unit 912 may apply a CNN-based filter that uses a LeakyReLU activation function, such as CNN-based filter 700. Thus, in some examples, reconstruction unit 910 may reconstruct a block of a picture, where the block may be a square or rectangular area of the picture and may or may not correspond to a coding block, prediction block, etc. Filter unit 912 may apply CNN-based filter 700 to the block, where CNN-based filter 700 uses a LeakyReLU activation function.

Video decoder 300 may store the reconstructed blocks in DPB 914. For instance, in examples where operations of filter unit 912 are not performed, reconstruction unit 910 may store reconstructed blocks to DPB 914. In examples where operations of filter unit 912 are performed, filter unit 912 may store the filtered reconstructed blocks to DPB 914. As discussed above, DPB 914 may provide reference information, such as samples of a current picture for intra-prediction and previously decoded pictures for subsequent motion compensation, to prediction processing unit 904. Moreover, video decoder 300 may output decoded pictures (e.g., decoded video) from DPB 914 for subsequent presentation on a display device, such as display device 118 of FIG. 1.

In this manner, video decoder 300 represents an example of a video decoding device including a memory configured to store video data, and one or more processing units implemented in circuitry and configured to reconstruct a block of the video data; and apply a CNN-based filter to the block, wherein the CNN-based filter uses a LeakyReLU activation function.

Figure 10:
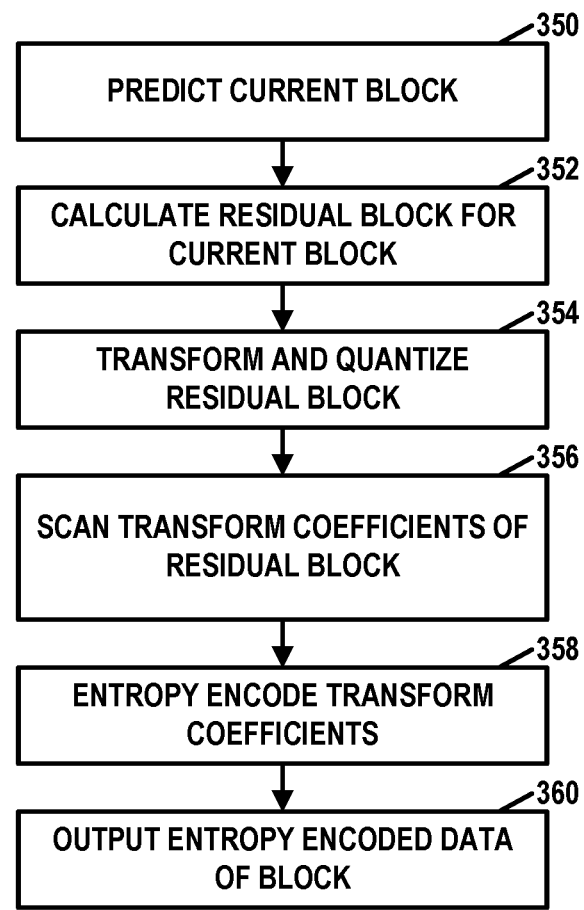
FIG. 10 is a flowchart illustrating an example method for encoding a current block in accordance with the techniques of this disclosure.

FIG. 10 is a flowchart illustrating an example method for encoding a current block in accordance with the techniques of this disclosure. The current block may comprise a current CU. Although described with respect to video encoder 200 (FIGS. 1 and 8), it should be understood that other devices may be configured to perform a method similar to that of FIG. 10.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 11:
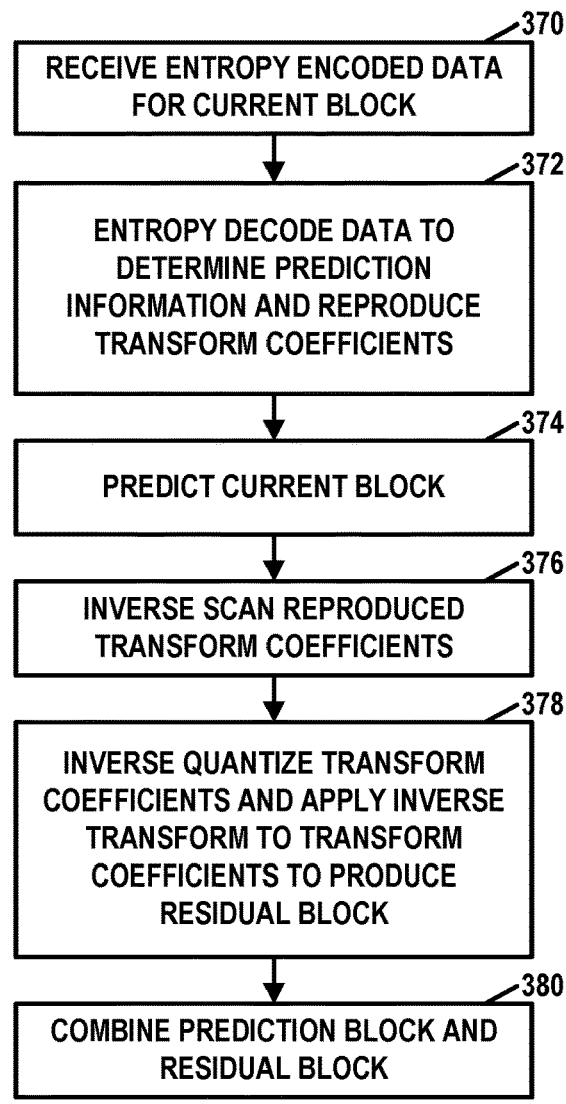
FIG. 11 is a flowchart illustrating an example method for decoding a current block in accordance with the techniques of this disclosure.

FIG. 11 is a flowchart illustrating an example method for decoding a current block of video data in accordance with the techniques of this disclosure. The current block may comprise a current CU. Although described with respect to video decoder 300 (FIGS. 1 and 9), it should be understood that other devices may be configured to perform a method similar to that of FIG. 11.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may ultimately decode the current block by combining the prediction block and the residual block (380). In some examples, video decoder 300 may further apply a CNN-based filter to the decoded block, wherein the CNN-based filter uses a LeakyReLU activation function.

Figure 12:
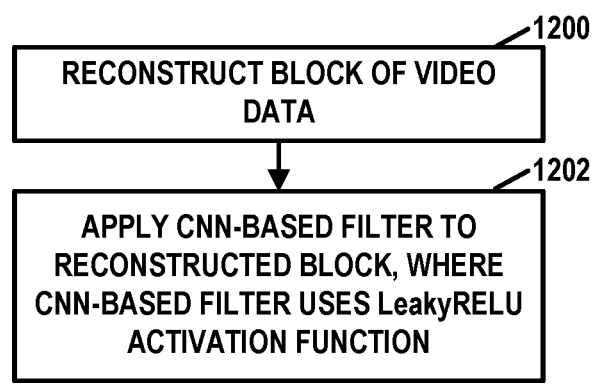
FIG. 12 is a flowchart illustrating an example operation of a video coder in accordance with one or more techniques of this disclosure.

FIG. 12 is a flowchart illustrating an example operation of a video coder (e.g., video encoder 200 or video decoder 300) in accordance with one or more techniques of this disclosure. In the example of FIG. 12, the video coder reconstructs a block of the video data (1200). The block of the video data may be a rectangular array of samples. The block may or may not correspond to a transform block, prediction block, coding block, coding tree block, or type of block used in the coding process. For example, the video coder (e.g., reconstruction unit 814 (FIG. 8) or reconstruction unit 910 (FIG. 9)) may reconstruct a picture that includes the block by adding residual data to corresponding prediction blocks.

Additionally, the video coder applies a CNN-based filter (e.g., CNN-based filter 700) to the reconstructed block (1202). The CNN-based filter uses a LeakyReLU activation function. As noted above, the LeakyReLU activation function is defined as:

$$f(y) = \begin{cases} \text{Alpha} * y, & y < 0 \\ y, & y \geq 0 \end{cases}$$

where y is an output value of a convolutional layer of a CNN and Alpha is a fixed parameter. In some examples, the CNN-based filter includes a plurality of convolutional layers and a value of Alpha is the same for each of the convolutional layers. In some examples, the CNN-based filter includes a plurality of convolutional layers and a value of Alpha is different for two or more of the convolutional layers.

In some examples where the video coder is video decoder 300, video decoder 300 may determine a value of Alpha based on one or more syntax elements signaled in a bitstream that comprises an encoded representation of the video data. For instance, the value of Alpha may be signaled in the bitstream. In other words, a syntax element may directly specify the value of Alpha. In another example, an index of Alpha in a predefined set is signaled in the bitstream. In this example, video decoder 300 may determine the value of Alpha in a predefined set to which the index of Alpha corresponds.

In some examples where the video coder is video encoder 200, the CNN-based filter includes a plurality of convolutional layers (e.g., convolutional layers 710) and video encoder 200 may determine a single value of Alpha for use in the LeakyReLU activation function applied to output values of the convolutional layers. Video encoder 200 may encode, in a bitstream that comprises an encoded representation of the video data, one or more syntax elements that provide information needed by a video decoder to derive the value of Alpha. In some examples, video encoder 200 signals an index of Alpha in a predefined set in the bitstream. In this example, video encoder 200 may determine the value of Alpha in the predefined set to which the index of Alpha corresponds. In other examples, video encoder 200 may determine a plurality of values of Alpha for use in the LeakyReLU activation function applied to output values of two or more different convolutional layers of the plurality of convolutional layers (e.g., convolutional layers 710). In such examples, video encoder 200 may encode, in a bitstream that comprises an encoded representation of the video data, one or more syntax elements that provide information needed by a video decoder to derive the values of Alpha.

The following is a non-limiting list of aspects that may be in accordance with one or more aspects of this disclosure.

Aspect 1A. A method of coding video data, the method comprising: reconstructing a block of the video data; and applying a Convolutional Neural Network (CNN)-based filter to the block, wherein the CNN-based filter uses a LeakyReLU activation function.

Aspect 2A. The method of aspect 1A, wherein the LeakyReLU activation function is defined as:

$$f(y) = \begin{cases} \text{Alpha} * y, & x < 0 \\ y, & x \geq 0 \end{cases}$$

where y is an output value of a convolutional layer of a CNN and Alpha is a fixed parameter.

Aspect 3A. The method of aspect 2A, wherein the CNN includes multiple convolutional layers and a value of Alpha is the same for each of the convolutional layers.

Aspect 4A. The method of aspect 2A, wherein the CNN includes multiple convolutional layers and a value of Alpha is different for two or more of the convolutional layers.

Aspect 5A. The method of any of aspects 2A-4A, further comprising determining a value of Alpha based on one or more syntax element signaled in a bitstream that comprises an encoded representation of the video data.

Aspect 6A. The method of aspect 5A, wherein the value of Alpha is signaled in the bitstream.

Aspect 7A. The method of aspect 5A, wherein an index of Alpha within a predefined set is signaled in the bitstream.

Aspect 8A. The method of any of aspects 1A-7A, wherein coding comprises decoding.

Aspect 9A. The method of any of aspects 1A-7A, wherein coding comprises encoding.

Aspect 10A. A device for coding video data, the device comprising one or more means for performing the method of any of aspects 1A-9A.

Aspect 11A. The device of aspect 10A, wherein the one or more means comprise one or more processors implemented in circuitry.

Aspect 12A. The device of any of aspects 10A and 11A, further comprising a memory to store the video data.

Aspect 13A. The device of any of aspects 10A-12A, further comprising a display configured to display decoded video data.

Aspect 14A. The device of any of aspects 10A-13A, wherein the device comprises one or more of a camera, a computer, a mobile device, a broadcast receiver device, or a set-top box.

Aspect 15A. The device of any of aspects 10A-14A, wherein the device comprises a video decoder.

Aspect 16A. The device of any of aspects 10A-15A, wherein the device comprises a video encoder.

Aspect 17A. A computer-readable storage medium having stored thereon instructions that, when executed, cause one or more processors to perform the method of any of aspects 1A-9A.

Aspect 1B: A method of encoding or decoding video data includes reconstructing a block of the video data; and applying a Convolutional Neural Network (CNN)-based filter to the reconstructed block, wherein the CNN-based filter uses a LeakyReLU activation function.

Aspect 2B: The method of aspect 1B, wherein the LeakyReLU activation function is defined as:

$$f(y) = \begin{cases} \text{Alpha} * y, & y < 0 \\ y, & y \geq 0 \end{cases}$$

where y is an output value of a convolutional layer of a CNN of the CNN-based filter and Alpha is a fixed parameter.

Aspect 3B: The method of aspect 2B, wherein the CNN includes a plurality of convolutional layers and a value of Alpha is the same for each of the convolutional layers.

Aspect 4B: The method of aspect 2B, wherein the CNN includes a plurality of convolutional layers and a value of Alpha is different for two or more of the convolutional layers.

Aspect 5B: The method of aspect 2B, further comprising determining a value of Alpha based on one or more syntax elements signaled in a bitstream that comprises an encoded representation of the video data.

Aspect 6B: The method of aspect 5B, wherein the value of Alpha is signaled in the bitstream.

Aspect 7B: The method of aspect 5B, wherein an index of Alpha within a predefined set is signaled in the bitstream, and wherein determining the value of Alpha comprises determining the value of Alpha in the predefined set to which the index of Alpha corresponds.

Aspect 8B: The method of aspect 2B, wherein the CNN includes a plurality of convolutional layers and the method further comprises: determining a single value of Alpha for use in the LeakyReLU activation function applied to output values of the convolutional layers; and encoding, in a bitstream that comprises an encoded representation of the video data, one or more syntax elements that provide information needed by a video decoder to derive the value of Alpha.

Aspect 9B. The method of aspect 8B, wherein the one or more syntax elements directly specify the value of Alpha.

Aspect 10B. The method of aspect 8B, wherein the one or more syntax elements specify an index of Alpha within a predefined set.

Aspect 11B: The method of aspect 2B, wherein the CNN includes a plurality of convolutional layers and the method further comprises: determining a plurality of values of Alpha for use in the LeakyReLU activation function applied to output values of two or more different convolutional layers of the plurality of convolutional layers; and encoding, in a bitstream that comprises an encoded representation of the video data, one or more syntax elements that provide information needed by a video decoder to derive the values of Alpha.

Aspect 12B. The method of aspect 11B, wherein the one or more syntax elements directly specify the value of Alpha.

Aspect 13B. The method of aspect 11B, wherein the one or more syntax elements specify an index of Alpha within a predefined set.

Aspect 14B: The method of aspect 1B, wherein the method comprises decoding the video data, and decoding the video data includes reconstructing the block of video data and applying the CNN-based filter to the reconstructed block.

Aspect 15B: The method of aspect 1B, wherein the method comprises encoding the video data, and encoding the video data includes reconstructing the block of video data and applying the CNN-based filter to the reconstructed block.

Aspect 16B: A device for encoding or decoding video data includes a memory to store the video data; and one or more processors implemented in circuitry, the one or more processors configured to: reconstruct a block of the video data; and apply a Convolutional Neural Network (CNN)-based filter to the reconstructed block, wherein the CNN-based filter uses a LeakyReLU activation function.

$$f(y) = \begin{cases} \text{Alpha} * y, & y < 0 \\ y, & y \geq 0 \end{cases}$$

Aspect 17B: The device of aspect 16B, wherein the LeakyReLU activation function is defined as:

$$f(y) = \begin{cases} \text{Alpha} * y, & y < 0 \\ y, & y \geq 0 \end{cases}$$

where y is an output value of a convolutional layer of a CNN of the CNN-based filter and Alpha is a fixed parameter.

Aspect 18B: The device of aspect 17B, wherein the CNN includes a plurality of convolutional layers and a value of Alpha is the same for each of the convolutional layers.

Aspect 19B: The device of aspect 17B, wherein the CNN includes a plurality of convolutional layers and a value of Alpha is different for two or more of the convolutional layers.

Aspect 20B: The device of aspect 17B, wherein the one or more processors are further configured to determine a value of Alpha based on one or more syntax elements signaled in a bitstream that comprises an encoded representation of the video data.

Aspect 21B: The device of aspect 20B, wherein the value of Alpha is signaled in the bitstream.

Aspect 22B: The device of aspect 20B, wherein an index of Alpha within a predefined set is signaled in the bitstream, and wherein determining the value of Alpha comprises determining the value of Alpha in the predefined set to which the index of Alpha corresponds.

Aspect 23B: The device of aspect 17B, wherein the CNN-based filter includes a plurality of convolutional layers and the one or more processors are further configured to: determine a single value of Alpha for use in the LeakyReLU activation function applied to output values of the convolutional layers; and encode, in a bitstream that comprises an encoded representation of the video data, one or more syntax elements that provide information needed by a video decoder to derive the value of Alpha.

Aspect 24B: The device of aspect 17B, wherein the CNN includes a plurality of convolutional layers and the one or more processors are further configured to: determine a plurality of values of Alpha for use in the LeakyReLU activation function applied to output values of two or more different convolutional layers of the plurality of convolutional layers; and encode, in a bitstream that comprises an encoded representation of the video data, one or more syntax elements that provide information needed by a video decoder to derive the values of Alpha.

Aspect 25B: The device of aspect 16B, further comprising a display configured to display decoded video data.

Aspect 26B: The device of aspect 16B, wherein the device comprises one or more of a camera, a computer, a mobile device, a broadcast receiver device, or a set-top box.

Aspect 27B: The device of aspect 16B, wherein the device comprises a video decoder.

Aspect 28B: The device of aspect 16B, wherein the device comprises a video encoder.

Aspect 29B: A device for coding video data includes means for reconstructing a block of the video data; and means for applying a Convolutional Neural Network (CNN)-based filter to the reconstructed block, wherein the CNN-based filter uses a LeakyReLU activation function.

Aspect 30B: A computer-readable storage medium having stored thereon instructions that, when executed, cause one or more processors to: reconstruct a block of the video data; and apply a Convolutional Neural Network (CNN)-based filter to the reconstructed block, wherein the CNN-based filter uses a LeakyReLU activation function.

Aspect 1C: A method of encoding or decoding video data includes reconstructing a block of the video data; and applying a Convolutional Neural Network (CNN)-based filter to the reconstructed block, wherein the CNN-based filter uses a LeakyReLU activation function.

$$f(y) = \begin{cases} \text{Alpha} * y, & y < 0 \\ y, & y \geq 0 \end{cases}$$

Aspect 2C: The method of aspect 1C, wherein the LeakyReLU activation function is defined as:

$$f(y) = \begin{cases} \text{Alpha} * y, & y < 0 \\ y, & y \geq 0 \end{cases}$$

where y is an output value of a convolutional layer of a CNN of the CNN-based filter and Alpha is a fixed parameter.

Aspect 3C: The method of aspect 2C, wherein the CNN includes a plurality of convolutional layers and a value of Alpha is the same for each of the convolutional layers.

Aspect 4C: The method of aspect 2C, wherein the CNN includes a plurality of convolutional layers and a value of Alpha is different for two or more of the convolutional layers.

Aspect 5C: The method of any of aspects 2C-4C, further comprising determining a value of Alpha based on one or more syntax elements signaled in a bitstream that comprises an encoded representation of the video data.

Aspect 6C: The method of aspect 5C, wherein the value of Alpha is signaled in the bitstream.

Aspect 7C: The method of aspect 5C, wherein an index of Alpha within a predefined set is signaled in the bitstream, and wherein determining the value of Alpha comprises determining the value of Alpha in the predefined set to which the index of Alpha corresponds.

Aspect 8C: The method of any of aspects 2C-3C or 5C-7C, wherein the CNN includes a plurality of convolutional layers and the method further comprises: determining a single value of Alpha for use in the LeakyReLU activation function applied to output values of the convolutional layers; and encoding, in a bitstream that comprises an encoded representation of the video data, one or more syntax elements that provide information needed by a video decoder to derive the value of Alpha.

Aspect 9C. The method of aspect 8C, wherein the one or more syntax elements directly specify the value of Alpha.

Aspect 10C. The method of aspect 8C, wherein the one or more syntax elements specify an index of Alpha within a predefined set.

Aspect 11C: The method of any of aspects 2C or 4C-7C, wherein the CNN includes a plurality of convolutional layers and the method further comprises: determining a plurality of values of Alpha for use in the LeakyReLU activation function applied to output values of two or more different convolutional layers of the plurality of convolutional layers; and encoding, in a bitstream that comprises an encoded representation of the video data, one or more syntax elements that provide information needed by a video decoder to derive the values of Alpha.

Aspect 12C. The method of aspect 11C, wherein the one or more syntax elements directly specify the value of Alpha.

Aspect 13C. The method of aspect 11C, wherein the one or more syntax elements specify an index of Alpha within a predefined set.

Aspect 14C: The method of any of aspects 1C-13C, wherein the method comprises decoding the video data, and decoding the video data includes reconstructing the block of video data and applying the CNN-based filter to the reconstructed block.

Aspect 15C: The method of any of aspects 1B-14C, wherein the method comprises encoding the video data, and encoding the video data includes reconstructing the block of video data and applying the CNN-based filter to the reconstructed block.

Aspect 16C: A device for encoding or decoding video data includes a memory to store the video data; and one or more processors implemented in circuitry, the one or more processors configured to: reconstruct a block of the video data; and apply a Convolutional Neural Network (CNN)-based filter to the reconstructed block, wherein the CNN-based filter uses a LeakyReLU activation function.

$$f(y) = \begin{cases} \text{Alpha} * y, & y < 0 \\ y, & y \geq 0 \end{cases}$$

Aspect 17C: The device of aspect 16C, wherein the LeakyReLU activation function is defined as:

$$f(y) = \begin{cases} \text{Alpha} * y, & y < 0 \\ y, & y \geq 0 \end{cases}$$

where y is an output value of a convolutional layer of a CNN of the CNN-based filter and Alpha is a fixed parameter.

Aspect 18C: The device of aspect 17C, wherein the CNN-based filter includes a plurality of convolutional layers and a value of Alpha is the same for each of the convolutional layers.

Aspect 19C: The device of aspect 17C, wherein the CNN-based filter includes a plurality of convolutional layers and a value of Alpha is different for two or more of the convolutional layers.

Aspect 20C: The device of aspect 17C-19C, wherein the one or more processors are further configured to determine a value of Alpha based on one or more syntax elements signaled in a bitstream that comprises an encoded representation of the video data.

Aspect 21C: The device of aspect 20C, wherein the value of Alpha is signaled in the bitstream.

Aspect 22C: The device of aspect 20C, wherein an index of Alpha within a predefined set is signaled in the bitstream, and wherein determining the value of Alpha comprises determining the value of Alpha in the predefined set to which the index of Alpha corresponds.

Aspect 23C: The device of any of aspects 17C-18C or 20C-22C, wherein the CNN-based filter includes a plurality of convolutional layers and the one or more processors are further configured to: determine a single value of Alpha for use in the LeakyReLU activation function applied to output values of the convolutional layers; and encode, in a bitstream that comprises an encoded representation of the video data, one or more syntax elements that provide information needed by a video decoder to derive the value of Alpha.

Aspect 24C: The device of any of aspect 17C or 18C-22C, wherein the CNN includes a plurality of convolutional layers and the one or more processors are further configured to: determine a plurality of values of Alpha for use in the LeakyReLU activation function applied to output values of two or more different convolutional layers of the plurality of convolutional layers; and encode, in a bitstream that comprises an encoded representation of the video data, one or more syntax elements that provide information needed by a video decoder to derive the values of Alpha.

Aspect 25C: The device of any of aspects 16C-24C, further comprising a display configured to display decoded video data.

Aspect 26C: The device of any of aspects 16C-25C, wherein the device comprises one or more of a camera, a computer, a mobile device, a broadcast receiver device, or a set-top box.

Aspect 27C: The device of any of aspects 16C-26C, wherein the device comprises a video decoder.

Aspect 28C: The device of any of aspects 16C-27C, wherein the device comprises a video encoder.

Aspect 29C: A device for coding video data includes means for reconstructing a block of the video data; and means for applying a Convolutional Neural Network (CNN)-based filter to the reconstructed block, wherein the CNN-based filter uses a LeakyReLU activation function.

Aspect 29C': The device of aspect 29C, comprising means for performing the methods of any of claims 1C-11C.

Aspect 30C: A computer-readable storage medium having stored thereon instructions that, when executed, cause one or more processors to: reconstruct a block of the video data; and apply a Convolutional Neural Network (CNN)-based filter to the reconstructed block, wherein the CNN-based filter uses a LeakyReLU activation function.

Aspect 30C': The computer-readable storage medium of aspect 26C, comprising means for performing the methods of any of claims 1C-15C.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but arfe instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data,ial method comprising:
    obtaining one or more syntax elements from a bitstream that comprises an encoded representation of the video data;
    reconstructing a block of the video data;
    applying a Convolutional Neural Network (CNN)-based filter to the reconstructed block, wherein:
        a CNN of the CNN-based filter includes a plurality of convolutional layers,
        the CNN-based filter applies a Leaky Rectified Linear Unit (LeakyReLU) activation function to output values of the convolutional layers, and
        for each convolutional layer of the plurality of convolutional layers, the LeakyReLU activation function applied to the output values of the convolutional layer is defined as:

$$f(y) = \begin{cases} \text{Alpha} * y, & y < 0 \\ y, & y \geq 0 \end{cases}$$

where y is an output value of the convolutional layer and Alpha is a fixed parameter; and
    for at least one convolutional layer of the plurality of convolutional layers, determining, based on the one or more syntax elements, a value of Alpha used in the LeakyReLU activation function applied to an output value of the at least one convolutional layer.

2. The method of claim 1, wherein the same value of Alpha is used in the LeakyReLU activation function applied to the output values of each of the convolutional layers.

3. The method of claim 1, wherein values of Alpha used in the LeakyReLU activation function applied to output values of two or more of the convolutional layers are different.

4. The method of claim 1, wherein the one or more syntax elements directly specify the value of Alpha.

5. The method of claim 1,
    wherein obtaining the set of one or more syntax elements comprises obtaining an index of Alpha within a predefined set is signaled in the bitstream, and
    wherein determining the value of Alpha comprises determining the value of Alpha in the predefined set to which the index of Alpha corresponds.

6. The method of claim 1, wherein:
    the method comprises determining a plurality of values of Alpha based on the one or more syntax elements, and applying the CNN-based filter to the reconstructed block comprises, applying the LeakyReLU activation function to output values of two or more different convolutional layers of the plurality of convolutional layers using different values of Alpha in the plurality of values of Alpha.

7. The method of claim 6, wherein the one or more syntax elements include a plurality of syntax elements that directly specify the plurality of values of Alpha.

8. The method of claim 6, wherein the one or more syntax elements include a plurality of syntax elements that specify a plurality of indexes of Alpha within a predefined set.

9. A device for decoding video data, the device comprising:
a memory to store the video data; and
one or more processors implemented in circuitry, the one or more processors configured to:
 obtain one or more syntax elements from a bitstream that comprises an encoded representation of the video data;
 reconstruct a block of the video data;
 apply a Convolutional Neural Network (CNN)-based filter to the reconstructed block, wherein:
  a CNN of the CNN-based filter includes a plurality of convolutional layers,
  the CNN-based filter applies a Leaky Rectified Linear Unit (LeakyReLU) activation function to output values of the convolutional layers, and
  for each convolutional layer of the plurality of convolutional layers, the LeakyReLU activation function applied to the output values of the convolutional layer is defined as:

$$f(y) = \begin{cases} \text{Alpha} * y, & y < 0 \\ y, & y \geq 0 \end{cases}$$

where y is an output value of the convolutional layer and Alpha is a fixed parameter; and
 for at least one convolutional layer of the plurality of convolutional layers, determine, based on the one or more syntax elements, a value of Alpha used in the LeakyReLU activation function applied to an output value of the at least one convolutional layer.

10. The device of claim 9, wherein the same value of Alpha is used in the LeakyReLU activation function applied to the output values of each of the convolutional layers.

11. The device of claim 9, wherein values of Alpha used in the LeakyReLU activation function applied to output values of two or more of the convolutional layers are different.

12. The device of claim 9, wherein the one or more syntax elements directly specify the value of Alpha.

13. The device of claim 9,
wherein the one or more processors are configured to, as part of obtaining the one or more syntax elements, obtain an index of Alpha within a predefined set is signaled in the bitstream, and wherein determining the value of Alpha comprises determining the value of Alpha in the predefined set to which the index of Alpha corresponds.

14. The device of claim 9, wherein:
the one or more processors are further configured to determine a plurality of values of Alpha based on the one or more syntax elements; and
the one or more processors are configured to, as part of applying the CNN-based filter to the reconstructed block, apply the LeakyReLU activation function to output values of two or more different convolutional layers of the plurality of convolutional layers using different values of Alpha in the plurality of values of Alpha.

15. The device of claim 14, wherein the one or more syntax elements include a plurality of syntax elements that directly specify the plurality of values of Alpha.

16. The device of claim 14, wherein the one or more syntax elements include a plurality of syntax elements that specify a plurality of indexes of Alpha within a predefined set.

17. The device of claim 9, further comprising a display configured to display decoded video data.

18. The device of claim 9, wherein the device comprises one or more of a camera, a computer, a mobile device, a broadcast receiver device, or a set-top box.

19. A non-transitory computer-readable storage medium having stored thereon instructions that, when executed, cause one or more processors to:
obtain one or more syntax elements from a bitstream that comprises an encoded representation of the video data;
reconstruct a block of video data;
apply Convolutional Neural Network (CNN)-based filter to the reconstructed block, wherein:
 a CNN of the CNN-based filter includes a plurality of convolutional layers,
 the CNN-based filter applies a Leaky Rectified Linear Unit (LeakyReLU) activation function to output values of the convolutional layers, and
 for each convolutional layer of the plurality of convolutional layers, the LeakyReLU activation function applied to the output values of the convolutional layer is defined as:

$$f(y) = \begin{cases} \text{Alpha} * y, & y < 0 \\ y, & y \geq 0 \end{cases}$$

where y is an output value of the convolutional layer and Alpha is a fixed parameter; and
for at least one convolutional layer of the plurality of convolutional layers, determine, based on the one or more syntax elements, a value of Alpha used in the LeakyReLU activation function applied to an output value of the at least one convolutional layer.

20. The non-transitory computer-readable storage medium of claim 19, wherein the same value of Alpha is used in the LeakyReLU activation function applied to the output values of each of the convolutional layers.

* * * * *